(12) United States Patent
Zhang et al.

(10) Patent No.: US 12,177,856 B2
(45) Date of Patent: Dec. 24, 2024

(54) DIFFERENTIATION OF FULL DUPLEX (FD) TRAFFIC SCHEDULING COMBINATIONS IN A WIRELESS WIDE AREA NETWORK (WWAN)

(71) Applicant: QUALCOMM Incorporated, San Diego, CA (US)

(72) Inventors: Qian Zhang, Basking Ridge, NJ (US); Yan Zhou, San Diego, CA (US); Jing Sun, San Diego, CA (US); Jelena Damnjanovic, Del Mar, CA (US); Sony Akkarakaran, Poway, CA (US); Tao Luo, San Diego, CA (US); Juan Montojo, San Diego, CA (US); Junyi Li, Fairless Hills, PA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 17/364,751

(22) Filed: Jun. 30, 2021

(65) Prior Publication Data
US 2023/0007679 A1   Jan. 5, 2023

(51) Int. Cl.
*H04W 72/12* (2023.01)
*H04L 5/00* (2006.01)
*H04L 5/14* (2006.01)
*H04W 72/04* (2023.01)
*H04W 72/23* (2023.01)

(52) U.S. Cl.
CPC .......... *H04W 72/23* (2023.01); *H04L 5/1438* (2013.01)

(58) Field of Classification Search
None
See application file for complete search history.

(56) References Cited

U.S. PATENT DOCUMENTS

| | | |
|---|---|---|
| 2011/0280164 A1 | 11/2011 | Luo et al. |
| 2015/0003302 A1* | 1/2015 | Ekpenyong ........... H04L 1/1861 370/280 |

(Continued)

OTHER PUBLICATIONS

Partial International Search Report—PCT/US2022/072801—ISA/EPO—Sep. 14, 2022.

(Continued)

*Primary Examiner* — Sai Aung
(74) *Attorney, Agent, or Firm* — Arun Swain

(57) ABSTRACT

This disclosure provides systems, methods, and apparatus, including computer programs encoded on computer-readable media, for implementing signaling for indicating a scheduled full duplex (FD) uplink (UL) and downlink (DL) traffic scheduling combination for differentiation of FD traffic. In some aspects, a BS may transmit a downlink control information (DCI) message that includes an indication of the scheduled FD UL and DL traffic scheduling combination. The FD UL and DL traffic scheduling combination may identify scheduled UL and DL transmissions for FD mode operation. The UE may receive the DCI message and identify the scheduled FD UL and DL traffic scheduling combination. In some aspects, the BS may provide a DCI message to the UE that indicates whether a DL transmission is being scheduled that at least partially overlaps with a scheduled UL transmission. The UE may initiate a power save mode based on the received DCI message.

25 Claims, 11 Drawing Sheets

(56) References Cited

U.S. PATENT DOCUMENTS

| | | | |
|---|---|---|---|
| 2016/0100422 A1* | 4/2016 | Papasakellariou | H04L 1/1822 |
| | | | 370/329 |
| 2016/0212734 A1* | 7/2016 | He | H04L 5/0048 |
| 2018/0097607 A1* | 4/2018 | Ji | H04W 72/23 |
| 2018/0343047 A1* | 11/2018 | He | H04B 7/0645 |
| 2019/0289513 A1 | 9/2019 | Jeon et al. | |
| 2020/0008230 A1* | 1/2020 | Yu | H04W 72/541 |
| 2020/0305133 A1 | 9/2020 | Zhou et al. | |
| 2021/0392625 A1* | 12/2021 | Lin | H04W 72/23 |
| 2022/0006603 A1* | 1/2022 | Lei | H04W 80/02 |
| 2022/0159698 A1* | 5/2022 | Hosseini | H04W 72/0446 |
| 2022/0182110 A1* | 6/2022 | Zhang | H04L 5/14 |
| 2022/0183027 A1* | 6/2022 | Zhang | H04L 5/16 |

OTHER PUBLICATIONS

International Search Report and Written Opinion—PCT/US2022/072801—ISA/EPO—Nov. 21, 2022.

* cited by examiner

DIFFERENTIATION OF FULL DUPLEX (FD) TRAFFIC SCHEDULING COMBINATIONS IN A WIRELESS WIDE AREA NETWORK (WWAN)

TECHNICAL FIELD

Aspects of the present disclosure relate generally to wireless communication and to techniques for implementing signaling for differentiation of full duplex (FD) traffic scheduling combinations in a wireless wide area network (WWAN).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the $3^{rd}$ generation (3G) and $4^{th}$ generation (4G, including long term evolution (LTE)) technologies to a next generation new radio (NR) technology, which may be referred to as $5^{th}$ Generation (5G) or 5G NR. For example, NR is designed to provide a lower latency, a higher bandwidth or a higher throughput, and a higher reliability than 3G or LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave (mmW)) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Wireless communication networks may support some combination of 2G, 3G, LTE, and 5G NR technologies. A UE may communicate with the wireless communication network using one or more of the 2G, 3G, LTE, and 5G NR technologies. For example, the UE may use 5G NR for some applications, such as data transmissions, and may use LTE for other applications, such as voice transmissions. A UE also may have access to wireless local area networks (WLANs) in the wireless communication network.

SUMMARY

The systems, methods, and devices of this disclosure each have several innovative aspects, no single one of which is solely responsible for the desirable attributes disclosed herein.

One aspect of the subject matter described in this disclosure can be implemented in a method for wireless communication performed by a first node. The method may include receiving, from a second node of a wireless wide area network (WWAN), a downlink control information (DCI) message for a first wireless connection with the second node. The DCI message may include an indication that a first full duplex (FD) uplink (UL) and downlink (DL) traffic scheduling combination of a plurality of FD UL and DL traffic scheduling combinations is being scheduled by the second node. The method may include transmitting UL traffic to the second node in accordance with the first FD UL and DL traffic scheduling combination, and receiving DL traffic from the second node in accordance with the first FD UL and DL traffic scheduling combination.

In some implementations, the plurality of FD UL and DL traffic scheduling combinations includes Physical Downlink Shared Channel (PDSCH) DL traffic and Physical Uplink Shared Channel (PUSCH) UL traffic, semi-persistent scheduling (SPS) DL traffic and PUSCH UL traffic, PDSCH DL traffic and configured grant (CG) UL traffic, and SPS DL traffic and CG UL traffic.

In some implementations, the method of receiving the DCI message may further include receiving one or more bits indicating the first FD UL and DL traffic scheduling combination is being scheduled by the second node, or detecting one or more fields indicating the first FD UL and DL traffic scheduling combination is being scheduled by the second node.

Another aspect of the subject matter described in this disclosure can be implemented in a method for wireless communication performed by a first node. The method may include scheduling a first FD UL and DL traffic scheduling combination of a plurality of FD UL and DL traffic scheduling combinations for a first wireless connection with a second node of a WWAN. The method may include generating a DCI message associated with the first wireless connection. The DCI message may include an indication of the first FD UL and DL traffic scheduling combination scheduled for the first wireless connection. The method may include transmitting the DCI message to the second node.

In some implementations, the method of generating the DCI message including the indication of the first FD UL and DL traffic scheduling combination further includes generating the DCI message by at least one of compressing one or more fields of the DCI message for scheduling DL and UL traffic via the DCI message, reusing one or more fields of the DCI message for scheduling DL and UL traffic via the DCI message, and using one or more reserved bits of the DCI message for scheduling DL and UL traffic via the DCI message.

Another aspect of the subject matter described in this disclosure can be implemented in a method for wireless communication performed by a first node. The method may include receiving, from a second node of a WWAN, a first DCI message indicating that an UL transmission is being scheduled during a first time period. The method may include receiving, from the second node, an indication indicating whether a DL transmission is being scheduled that at least partially overlaps with the UL transmission scheduled during the first time period while operating in an FD mode.

In some implementations, in response to the indication indicating that a DL transmission is not scheduled during the first time period, the method may include initiating a power save mode during the first time period that ceases monitoring for a DL transmission during the first time period.

Another aspect of the subject matter described in this disclosure can be implemented in an apparatus of a first node. The apparatus of the first node may include one or more processors and one or more interfaces. The one or more processors may be configured to establish a first wireless connection with a second node of a WWAN. The one or more interfaces may be configured to receive, from the second node, a DCI message for the first wireless connection. The DCI message may include an indication that a first FD UL and DL traffic scheduling combination of a plurality of FD UL and DL traffic scheduling combinations is being scheduled by the second node. The one or more interfaces may be configured to transmit UL traffic to the second node in accordance with the first FD UL and DL traffic scheduling combination, and receive DL traffic from the second node in accordance with the first FD UL and DL traffic scheduling combination.

Aspects of the subject matter described in this disclosure can be implemented in a device, a software program, a system, or other means to perform any of the above-mentioned methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
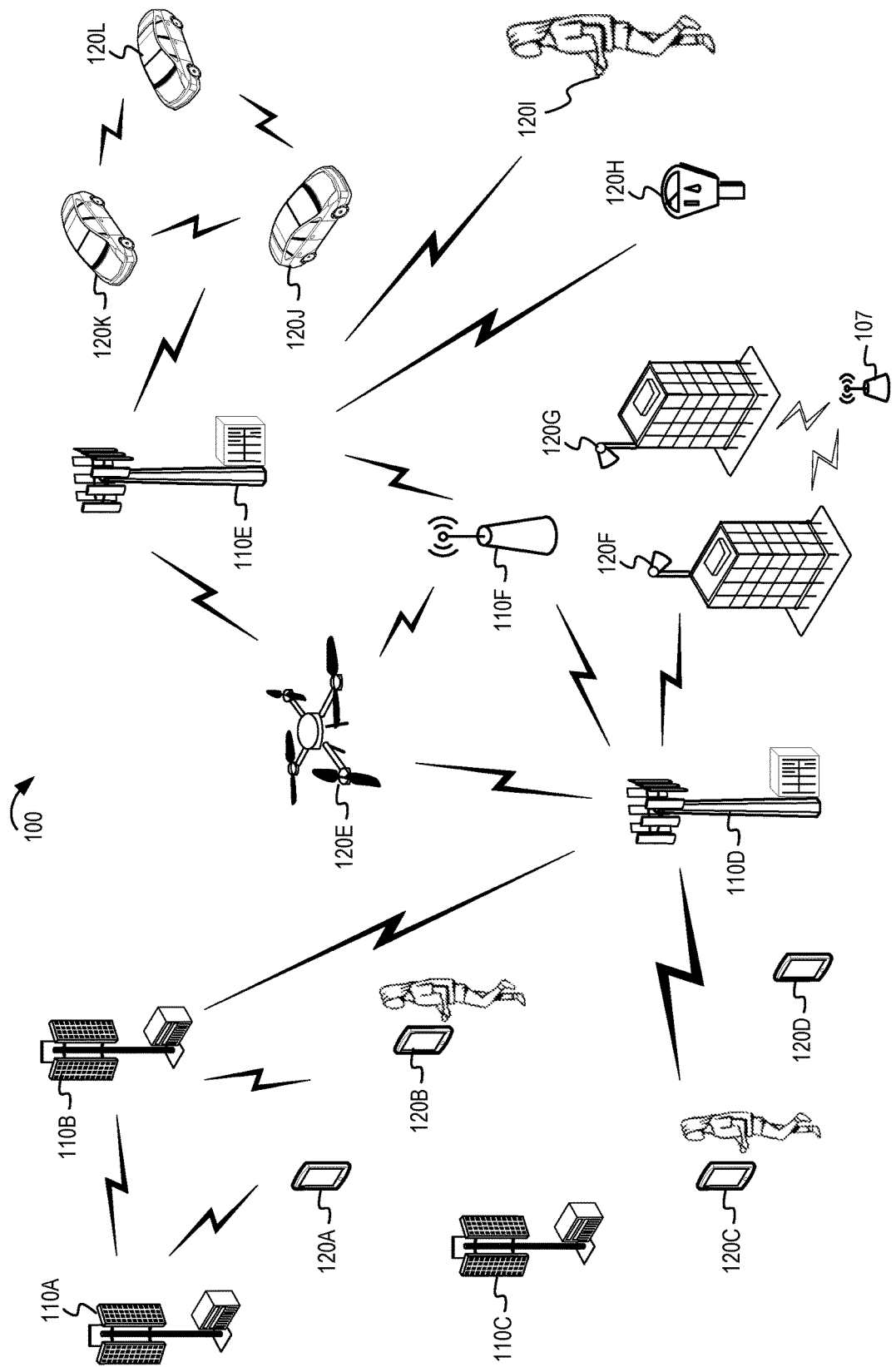
FIG. 1 is a system diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless network communications in wide area networks (WANs). However, the described implementations may be implemented in any device, system or network that is capable of transmitting and receiving radio frequency signals according to any of the wireless communication standards, including any of the Institute of Electrical and Electronics Engineers (IEEE) 802.11 standards, the Bluetooth® standard, code division multiple access (CDMA), time division multiple access (TDMA), frequency division multiple access (FDMA), orthogonal FDMA (OFDMA), single-carrier FDMA (SC-FDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), $5^{th}$ Generation (5G) or new radio (NR), Advanced Mobile Phone Service (AMPS), or other known signals that are used to communicate within a wireless, cellular or internet of things (IoT) network, such as a system utilizing 3G, 4G or 5G, or further implementations thereof, technology.

A wireless communication network (which also may be referred to as a wireless WAN or WWAN) may include base stations (BSs) that implement a 5G NR radio access technology (RAT) of a 5G NR network and BSs that implement an LTE RAT of an LTE network. The RATs of a WWAN also may be referred to as WWAN RATs. A user equipment (UE) of the wireless communication network may use the 5G NR RAT or the LTE RAT depending on which wireless coverage is available to the UE and which wireless coverage provides the best quality service.

The 5G NR BSs and UEs may have full duplex (FD) capabilities to perform FD transmissions. FD transmissions may include a downlink (DL) transmission from a BS to a UE that at least partially overlaps in time with an uplink (UL) transmission from the UE to the BS during a time period. FD transmissions may be performed when the BS and UE are operating in a FD mode that enables the BS and the UE to both transmit and receive. FD transmissions may be conditional on various factors, such as having sufficient beam separation and minimal clutter echo. For example, to reduce the self-interference from the UL transmission beam to its DL reception beam, the beams used for the UL and DL transmissions and receptions may be separated in order to have sufficient beam separation.

In some aspects, a BS may transmit a first downlink control information (DCI) message to a UE to schedule an UL transmission and may transmit a second DCI message to the UE to schedule the DL transmission. The UE may receive the first and second DCI messages and identify the scheduled DL and UL transmissions. The UE also may determine whether the UL and UL transmissions are FD transmissions. In some aspects, after the UE receives the first DCI message, the UE may monitor for additional DCI messages, such as the second DCI message, to ascertain whether the UL transmission will be a full-duplex transmission or whether a DL transmission will be scheduled for FD operation.

In some implementations, the BS may transmit a DCI message to the UE that indicates which FD UL and DL traffic scheduling combination is being scheduled by the BS. The DCI message may include an indication of the scheduled FD UL and DL traffic scheduling combination to differentiate between the various FD UL and DL traffic scheduling combinations. Each of the various FD UL and DL traffic scheduling combinations may include at least one UL transmission and at least one DL transmission. For example, the various FD UL and DL traffic scheduling combinations may include a first FD UL and DL traffic scheduling combination that includes physical downlink shared channel (PDSCH) DL traffic and physical uplink shared channel (PUSCH) UL traffic, a second FD UL and DL traffic scheduling combination that includes semi-persistent scheduling (SPS) DL traffic and PUSCH UL traffic, a third FD UL and DL traffic scheduling combination that includes PDSCH DL traffic and configured grant (CG) UL traffic, and a fourth FD UL and DL traffic scheduling combination that includes SPS DL traffic and CG UL traffic. The UE may receive the DCI message and may identify which FD UL and DL traffic scheduling combination is being scheduled by the BS based on the indication in the DCI message. The UL transmission and the DL transmission associated with the scheduled FD UL and DL traffic scheduling combination may at least partially overlap during a time period.

In some implementations, the DCI message that includes the indication of the scheduled FD UL and DL traffic scheduling combination may have an existing DCI message format. In some implementations, the BS may generate the DCI message that includes the indication of the scheduled FD UL and DL traffic scheduling combination by compressing one or more fields of the DCI message, reusing one or more fields of the DCI message, or using one or more reserved bits of the DCI message to indicate the scheduled FD UL and DL traffic scheduling combination. In some implementations, the BS may use one or more dedicated bits or one or more special field bits of the DCI message for the indication of the scheduled FD UL and DL traffic scheduling combination. In some implementations, the indication of the scheduled FD UL and DL traffic scheduling combination may be a new identifier that indicates which one of the various FD UL and DL traffic scheduling combinations is being scheduled by the BS. The new identifier may be any number of bits, such as a 2-bit identifier or a 3-bit identifier. In some implementations, the BS may use a Radio Network Temporary Identity (RNTI) to indicate a DL transmission of the scheduled FD UL and DL traffic scheduling combination and may use one or more bits of the DCI message to indicate a UL transmission of the scheduled FD UL and DL traffic scheduling combination.

In some implementations, the DCI message that includes the indication of the scheduled FD UL and DL traffic scheduling combination may have a new DCI message format. In some implementations, the new DCI message format may have a larger payload than the existing DCI message formats. The new DCI message format may include one or more dedicated fields or one or more dedicated bits in the payload that may be used for the indication of the scheduled FD UL and DL traffic scheduling combination.

In some implementations, the BS may use an RNTI to indicate which one of the various FD UL and DL traffic scheduling combinations is being scheduled by the BS. For example, a first RNTI may indicate a first FD UL and DL traffic scheduling combination, a second RNTI may indicate a second FD UL and DL traffic scheduling combination, a third RNTI may indicate a third FD UL and DL traffic scheduling combination, and a fourth RNTI may indicate a fourth FD UL and DL traffic scheduling combination. The BS may use the selected RNTI for a DCI message having the existing DCI message format or the new DCI message format having the larger payload.

In some implementations, when the BS uses two separate DCI messages to specify the allocations for the DL and UL transmissions, the BS may include an indication in the first DCI message that indicates whether there is a DL transmission scheduled during a first time period that may at least partially overlap in time with a UL transmission. The UE may initiate a power save mode that ceases monitoring for a DL transmission during the first time period if the indication indicates that a DL transmission is not scheduled during the first time period. The UE may continue monitoring for the DL transmission during the first time period if the indication indicates that the DL transmission is scheduled during the first time period and thus the scheduled DL transmission at least partially overlaps in time with the scheduled UL transmission.

Particular implementations of the subject matter described in this disclosure can be implemented to realize one or more of the following potential advantages. A DCI message including an indication of which FD UL and DL traffic scheduling combination is being scheduled by the BS may allow the UE to differentiate between the various FD UL and DL traffic scheduling combinations that are available during a FD mode. The BS scheduling FD transmissions using the DCI message may reduce latency, improve spectrum efficiency, and may result in the efficient use of communication resources. A DCI message including an indication that indicates when a DL transmission is not being scheduled at the same time period as a UL transmission may allow the UE to save power by ceasing monitoring for a DL transmission during the time period. Saving power at the UE may increase the battery life of the UE and thus may improve the overall performance of the UE and the user experience.

FIG. 1 is a system diagram of an example wireless communication network 100. The wireless communication network 100 may be an LTE network or a 5G NR network, or a combination thereof. The wireless communication network 100 also may be referred to as a wide area network (WAN) or a wireless wide area network (WWAN). The wireless communication network 100 includes a number of base stations (BSs) 110 (individually labeled as 110A, 110B, 110C, 110D, 110E, and 110F) and other network entities. A BS 110 may be a station that communicates with UEs 120 and also may be referred to as an evolved node B (eNB), a next generation eNB (gNB), an access point, and the like. In some implementations, a BS 110 may represent an eNB of an LTE network or a gNB of a 5G NR network, or a combination thereof. Each BS 110 may provide communication coverage for a particular geographic area. In 3GPP, the term "cell" can refer to this particular geographic coverage area of a BS 110 or a BS subsystem serving the coverage area, depending on the context in which the term is used.

ABS 110 may provide communication coverage for a macro cell or a small cell, such as a pico cell or a femto cell, or other types of cells. A macro cell generally covers a relatively large geographic area (such as several kilometers in radius) and may allow unrestricted access by UEs with service subscriptions with the network provider. A pico cell generally covers a relatively smaller geographic area and may allow unrestricted access by UEs with service subscriptions with the network provider. A femto cell generally covers a relatively small geographic area (such as a home) and, in addition to unrestricted access, also may provide restricted access by UEs having an association with the femto cell (such as UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 110D and 110E may be regular macro BSs, while the BSs 110A-110C may be macro BSs enabled with three dimensions (3D), full dimensions (FD), or massive MIMO. The BSs 110A-110C may take advantage of their higher dimension MIMO capabilities to exploit 3D beamforming in both elevation and azimuth beamforming to increase coverage and capacity. The BS 110F may be a small cell BS which may be a home node or portable access point. A BS 110 may support one or multiple (such as two, three, four, and the like) cells.

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 120 are dispersed throughout the wireless communication network 100, and each UE 120 may be stationary or mobile. A UE 120 also may be referred to as a terminal, a mobile station, a wireless device, a subscriber unit, a station, or the like. A UE 120 may be a mobile phone, a personal digital assistant (PDA), a wireless modem, a wireless communication device, a handheld device, a wearable device, a tablet computer, a laptop computer, a cordless phone, a wireless local loop (WLL) station, a smart appliance, a drone, a video camera, a sensor, or the like. In one aspect, a UE 120 may be a device that includes a Universal Integrated Circuit Card (UICC). In another aspect, a UE may be a device that does not include a UICC. In some aspects, the UEs 120 that do not include UICCs also may be referred to as IoT devices or internet of everything (IoE) devices. The UEs 120A-120D are examples of mobile smart phone-type devices that may access the wireless communication network 100. A UE 120 also may be a machine specifically configured for connected communication, including machine type communication (MTC), enhanced MTC (eMTC), narrowband IoT (NB-IoT), and the like. The UEs 120E-120L are examples of various machines configured for communication that access the wireless communication network 100. A UE 120 may be able to communicate with any type of the BSs, whether macro BS, small cell, or the like. In FIG. 1, a lightning bolt is representative of a communication link that indicates wireless transmissions between a UE 120 and a serving BS 110, which is a BS designated to serve the UE 120 on the downlink and uplink, or desired transmission between BSs, and backhaul transmissions between BSs.

In operation, the BSs 110A-110C may serve the UEs 120A and 120B using 3D beamforming and coordinated spatial techniques, such as coordinated multipoint (CoMP) or multi-connectivity. The macro BS 110D may perform backhaul communications with the BSs 110A-110C, as well as the BS 110F (which may be a small cell BS). The macro BS 110D also may transmit multicast services which are subscribed to and received by the UEs 120C and 120D. Such multicast services may include mobile television or stream video, or may include other services for providing community information, such as weather emergencies or alerts, such as Amber alerts or gray alerts.

The BSs 110 also may communicate with a core network. The core network may provide user authentication, access authorization, tracking, Internet Protocol (IP) connectivity, and other access, routing, or mobility functions. At least some of the BSs 110 (such as a gNB or an access node controller (ANC)) may interface with the core network through backhaul links (such as NG-C and NG-U) and may perform radio configuration and scheduling for communication with the UEs 120. In various examples, the BSs 110 may communicate, either directly or indirectly (such as through core network), with each other over backhaul links, which may be wired or wireless communication links.

The wireless communication network 100 also may support mission critical communications with ultra-reliable and redundant links for mission critical devices, such as the UE 120E, which may be a drone. Redundant communication links with the UE 120E may include links from the macro BSs 110D and 110E, as well as links from the small cell BS 110F. Other machine type devices, such as the UE 120F and UE 120G (such as video cameras or smart lighting), the UE 120H (such as a smart meter), and UE 120I (such as a wearable device) may communicate through the wireless communication network 100 either directly with the BSs, such as the small cell BS 110F, and the macro BS 110E, or in multi-hop configurations by communicating with another user device which relays its information to the wireless communication network 100. For example, the UE 120H may communicate smart meter information to the UE 120I (such as a wearable device or mobile phone), which may report to the wireless communication network 100 through the small cell BS 110F. The wireless communication network 100 also may provide additional network efficiency through dynamic, low-latency TDD/FDD communications, such as in vehicle-to-vehicle (V2V) communications, as shown by UEs 120J-120L. Furthermore, the wireless communication network 100 may include one or more access points (APs) 107 that are part of one or more wireless local area networks (WLANs). The APs 107 (which also may be referred to as WLAN APs) may provide short-range wireless connectivity to the UEs 120 of the wireless communication network 100.

In some implementations, the wireless communication network 100 may utilize OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW also may be partitioned into subbands. In other instances, the subcarrier spacing and/or the duration of TTIs may be scalable.

The BSs 110 may assign or schedule transmission resources (such as in the form of time-frequency resource blocks (RB)) for downlink (DL) and uplink (UL) transmissions in the wireless communication network 100. DL refers to the transmission direction from a BS 110 to a UE 120, whereas UL refers to the transmission direction from a UE 120 to a BS 110. The communication can be in the form of radio frames. A radio frame may be divided into a plurality of subframes or slots. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (such as the DL subframes) in a radio frame may be used for DL transmissions, and another subset of the subframes (such as the UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 110 and the UEs 120. For example, a reference signal can have a particular pilot pattern or structure, where pilot tones may span across an operational BW or frequency band, each positioned at a pre-defined time and a pre-defined frequency. For example, a BS 110 may transmit cell-specific reference signals (CRSs) or channel state information reference signals (CSI-RSs) to enable a UE 120 to estimate a DL channel. Similarly, a UE 120 may transmit sounding reference signals (SRSs) to enable a BS 110 to estimate a UL channel. Control information may include resource assignments and protocol controls. Data may include protocol data and operational data. In some aspects, the BSs 110 and the UEs 120 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the wireless communication network 100 may be an NR network deployed over a licensed spectrum or an NR network deployed over an unlicensed spectrum (such as NR-U and NR-U lite networks). The BSs 110 can transmit synchronization signals, including a primary synchronization signal (PSS) and a secondary synchronization signal (SSS), in the wireless communication network 100 to facilitate synchronization. The BSs 110 can broadcast system information associated with the wireless communication network 100 (such as a master information block (MIB), remaining system information (RMSI), and other system information (OSI)) to facilitate initial network access. In some instances, the BSs 110 may broadcast one or more of the PSS, the SSS, and the MIB in the form of synchronization signal block (SSBs) over a physical broadcast channel (PBCH) and may broadcast one or more of the RMSI and the OSI over a physical downlink shared channel (PDSCH).

In some aspects, a UE 120 attempting to access the wireless communication network 100 may perform an initial cell search by detecting a PSS included in an SSB from a BS 110. The PSS may enable synchronization of period timing and may indicate a physical layer identity value. The UE 120 may receive an SSS included in an SSB from the BS 110. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 120 may receive an MIB. The MIB may include system information for initial network access and scheduling information for at least one of an RMSI and OSI. After decoding the MIB, the UE 120 may receive at least one of an RMSI and OSI. The RMSI and OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining one or more of the MIB, the RMSI and the OSI, the UE 120 can perform a random access procedure to establish a connection with the BS 110. In some examples, the random access procedure may be a four-step random access procedure. For example, the UE 120 may transmit a physical random access channel (PRACH), such as a PRACH preamble, and the BS 110 may respond with a random access response (RAR). The RAR may include one or more of a detected random access preamble identifier (ID) corresponding to the PRACH preamble, timing advance (TA) information, a UL grant, a temporary cell-radio network temporary identifier (C-RNTI), and a backoff indicator. Upon receiving the RAR, the UE 120 may transmit a connection request to the BS 110 and the BS 110 may respond with a connection response. The connection response may indicate a contention resolution. In some examples, the PRACH, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 120 may transmit a PRACH (including a PRACH preamble) and a connection request in a single transmission and the BS 110 may respond by transmitting a RAR and a connection response in a single transmission.

After establishing a connection, the UE 120 and the BS 110 can enter a normal operation stage, where operational data may be exchanged. For example, the BS 110 may schedule the UE 120 for UL and DL communications. The BS 110 may transmit UL and DL scheduling grants to the UE 120 via a PDCCH. The BS 110 may transmit a DL communication signal to the UE 120 via a PDSCH according to a DL scheduling grant. The UE 120 may transmit a UL communication signal to the BS 110 via a PUSCH or PUCCH according to a UL scheduling grant.

In some aspects, the wireless communication network 100 may operate over a system BW or a component carrier BW. The wireless communication network 100 may partition the system BW into multiple bandwidth parts (BWPs). A BWP may be a certain portion of the system BW. For example, if the system BW is 100 MHz, the BWPs may each be 20 MHz or less. A BS 110 may dynamically assign a UE 120 to operate over a certain BWP. The assigned BWP may be referred to as the active BWP. The UE 120 may monitor the active BWP for signaling information from the BS 110. The BS 110 may schedule the UE 120 for UL or DL communications in the active BWP. In some implementations, the BS 110 may configure UEs 120 with narrowband operation capabilities (such as with transmission and reception limited to a BW of 20 MHz or less) to perform BWP hopping for channel monitoring and communications.

In some aspects, a BS 110 may assign a pair of BWPs within the component carrier to a UE 120 for UL and DL communications. For example, the BWP pair may include one BWP for UL communications and one BWP for DL communications. The BS 110 may additionally configure the UE 120 with one or more CORESETs in a BWP. A CORESET may include a set of frequency resources spanning a number of symbols in time. The BS 110 may configure the UE 120 with one or more search spaces for PDCCH monitoring based on the CORESETS. The UE 120 may perform blind decoding in the search spaces to search for DL control information (such as UL or DL scheduling grants) from the BS 110. For example, the BS 110 may configure the UE 120 with one or more of the BWPs, the CORESETS, and the PDCCH search spaces via RRC configurations.

In some aspects, the wireless communication network 100 may operate over a shared frequency band or an unlicensed frequency band, for example, at about 3.5 gigahertz (GHz), sub-6 GHz or higher frequencies in the mmWave band. The wireless communication network 100 may partition a frequency band into multiple channels, for example, each occupying about 20 MHz. The BSs 110 and the UEs 120 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT also may be referred to as a transmission opportunity (TXOP). The BS 110 or the UE 120 may perform an LBT in the frequency band prior to transmitting in the frequency band. The LBT can be based on energy detection or signal detection. For energy detection, the BS 110 or the UE 120 may determine that the channel is busy or occupied when a signal energy measured from the channel is greater than a certain signal energy threshold. For signal detection, the BS 110 or the UE 120 may determine that the channel is busy or occupied when a certain reservation signal (such as a preamble signal sequence) is detected in the channel.

Figure 2:
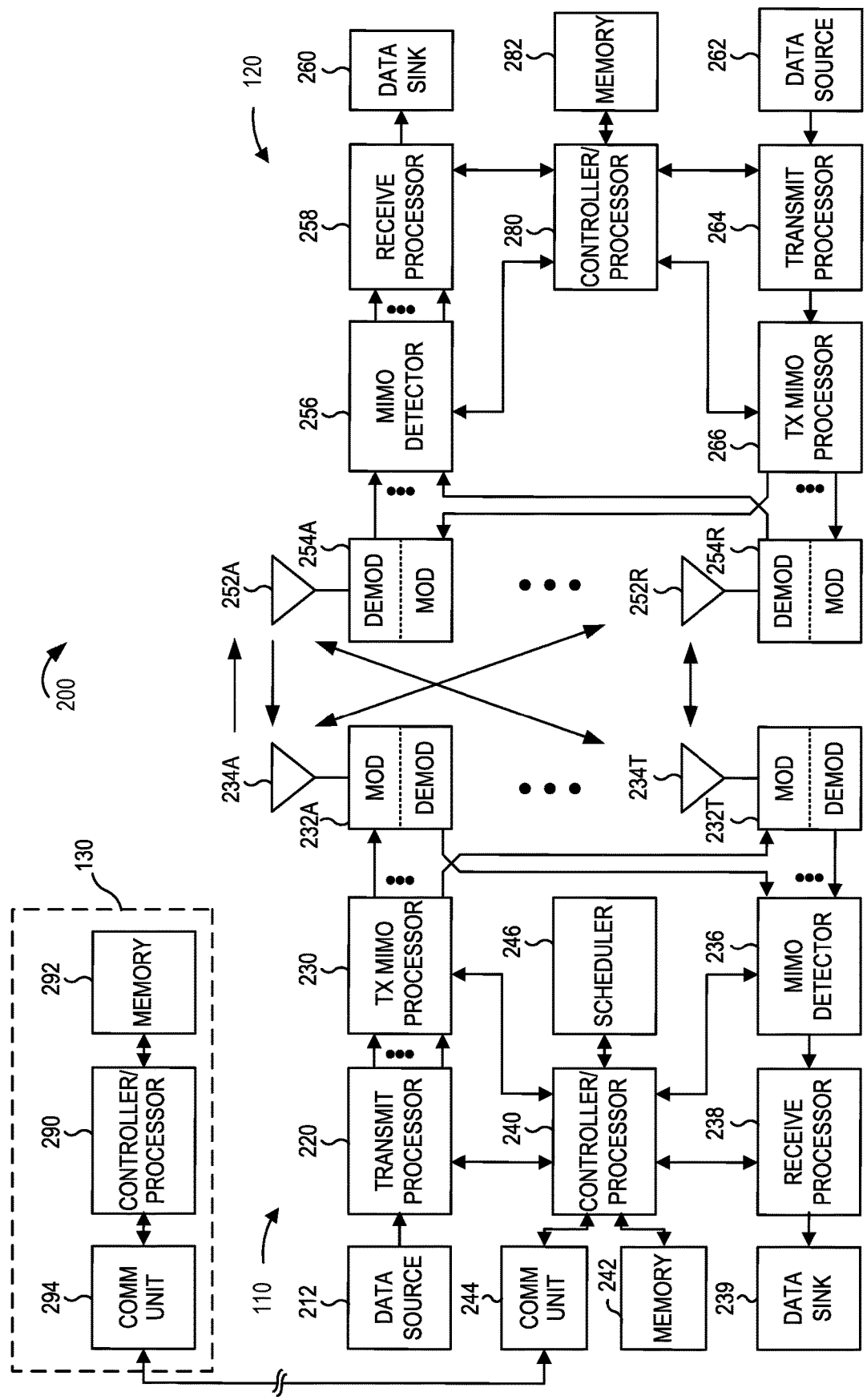
FIG. 2 is a block diagram conceptually illustrating an example of a base station (BS) in communication with a user equipment (UE).

FIG. 2 is a block diagram conceptually illustrating an example 200 of a BS 110 in communication with a UE 120. In some aspects, BS 110 and UE 120 may respectively be one of the BSs and one of the UEs in wireless communication network 100 of FIG. 1. BS 110 may be equipped with T antennas 234A through 234T, and UE 120 may be equipped with R antennas 252A through 252R, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators-demodulators (MODs-DEMODs) 232A through 232T (which also may be referred to as mods/demods or modems). Each MOD-DEMOD 232 may process a respective output symbol stream (for example, for OFDM, etc.) to obtain an output sample stream. Each MOD-DEMOD 232 may further process (for example, convert to analog, amplify, filter, and upconvert) the output sample stream to obtain a downlink signal. T downlink signals from MODs-DEMODs 232A through 232T may be transmitted via T antennas 234A through 234T, respectively. According to various aspects described in more detail below, the synchronization signals can be generated with location encoding to convey additional information.

At UE 120, antennas 252A through 252R may receive the downlink signals from BS 110 or other BSs and may provide received signals to modulators-demodulators (MODs-DEMODs) 254A through 254R, respectively (which also may be referred to as mods/demods or modems). Each MOD-DEMOD 254 may condition (for example, filter, amplify, downconvert, and digitize) a received signal to obtain input samples. Each MOD-DEMOD 254 may further process the input samples (for example, for OFDM, etc.) to obtain received symbols. A MIMO detector 256 may obtain received symbols from all R MODs-DEMODs 254A through 254R, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by MODs-DEMODs 254A through 254R (for example, for DFT-s-OFDM, CP-OFDM, etc.), and transmitted to BS 110. At BS 110, the uplink signals from UE 120 and other UEs may be received by antennas 234, processed by MOD-DEMOD 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The BS 110 may include communication unit 244 and may communicate to network controller 130 via communication unit 244. The network controller 130 may include communication unit 294, a controller or processor (i.e., controller/processor) 290, and memory 292.

The controller/processor 240 of BS 110, the controller/processor 280 of UE 120, or any other component(s) of FIG. 2 may perform one or more techniques associated with implementing signaling for differentiation of FD traffic scheduling combinations, as described in more detail elsewhere herein. For example, the controller/processor 240 of BS 110, the controller/processor 280 of UE 120, or any other component(s) (or combinations of components) of FIG. 2 may perform or direct operations of, for example, the process depicted by flowchart 700 of FIG. 7, the process depicted by flowchart 800 of FIG. 8, the process depicted by flowchart 900 of FIG. 9 or other processes as described herein, such as the processes described in FIGS. 3-6. The memories 242 and 282 may store data and program codes for BS 110 and UE 120, respectively. A scheduler 246 may schedule UEs for data transmission on the downlink, the uplink, or a combination thereof.

Figure 5:
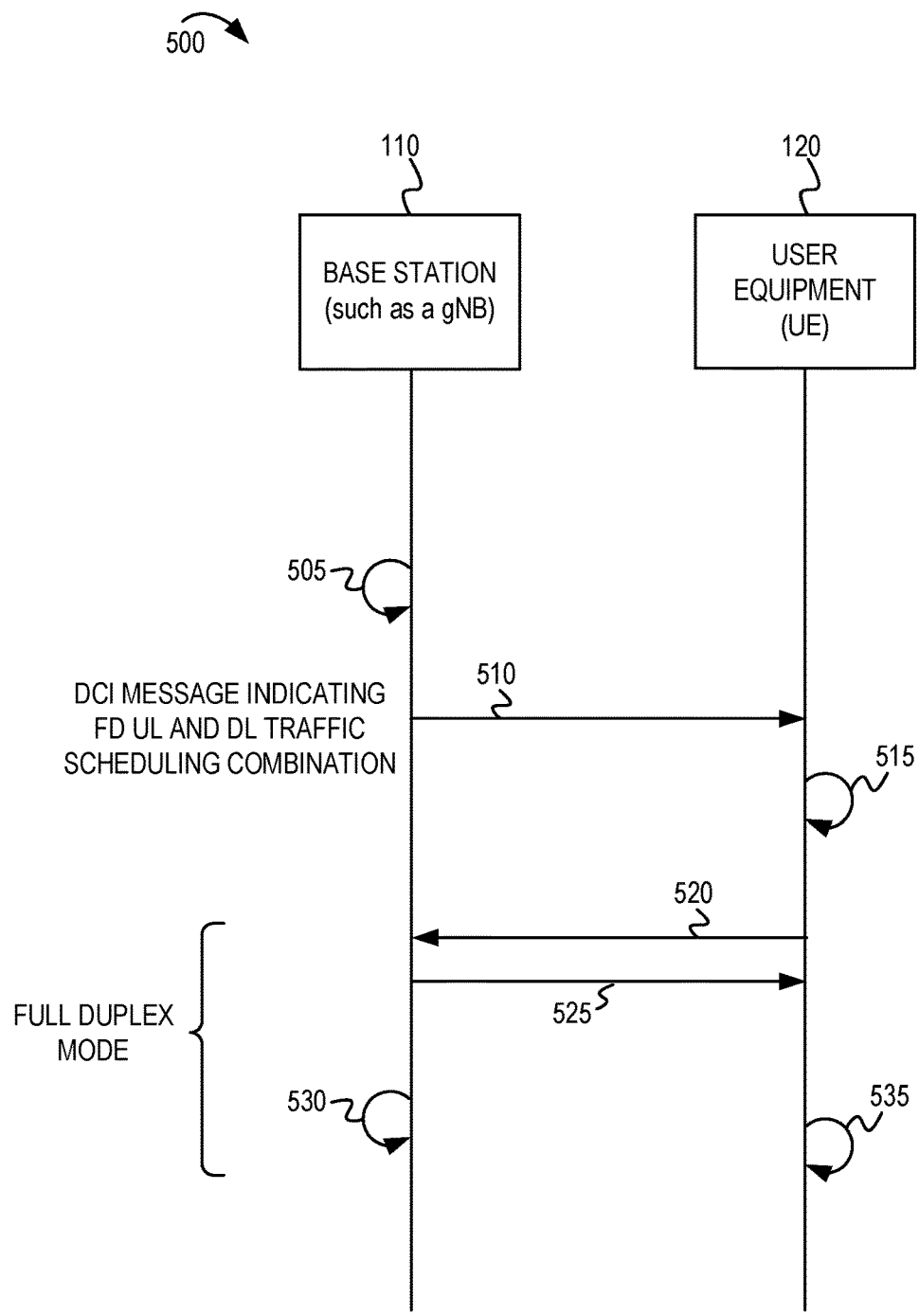
FIG. 5 shows an example message flow that shows signaling from a BS to a UE that indicates a scheduled FD UL and DL traffic scheduling combination using a downlink control information (DCI) message for differentiation of FD traffic.
Figure 6:
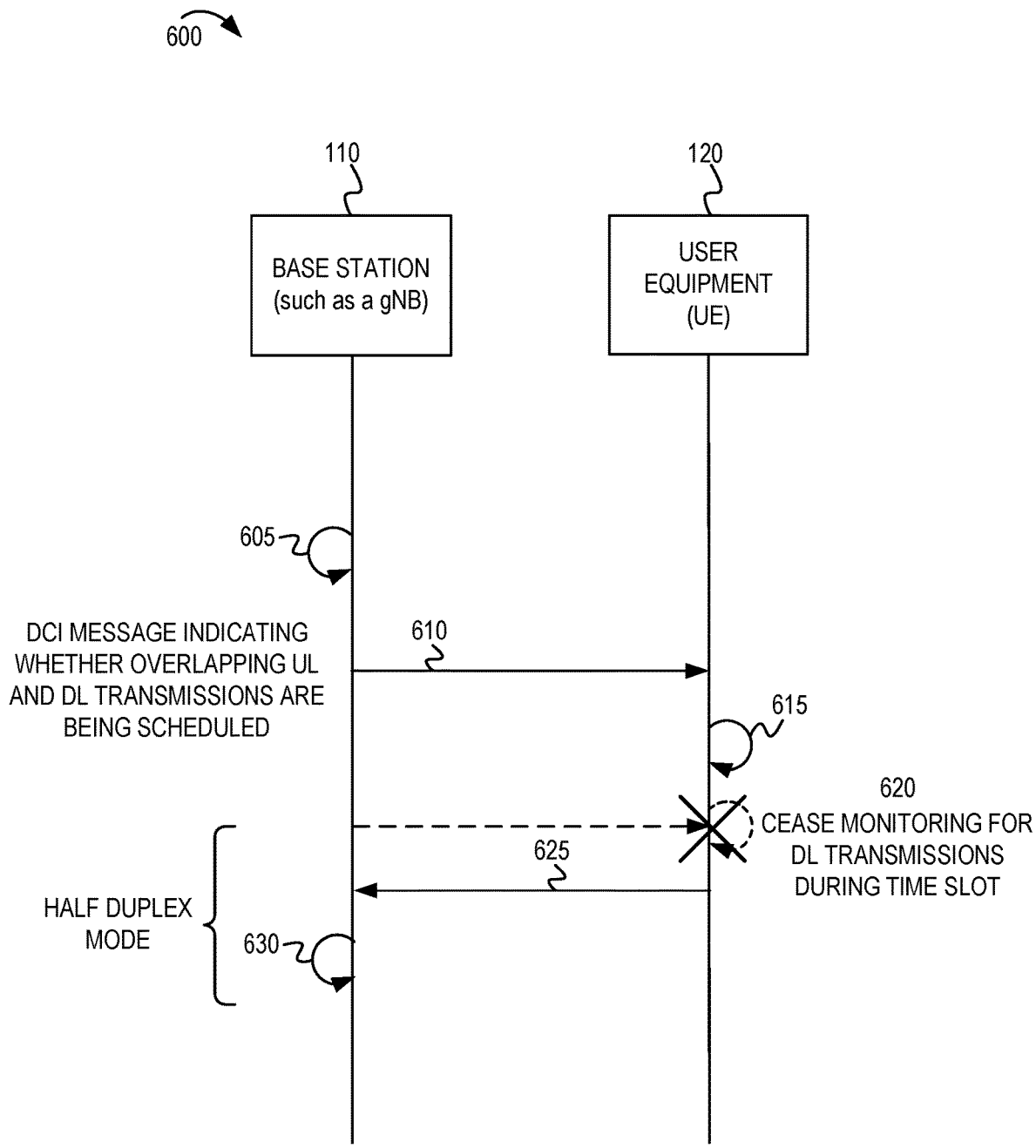
FIG. 6 shows an example message flow that shows signaling from a BS to a UE that indicates whether HD or FD transmissions have been scheduled which may enable the UE to implement a power save mode.
Figure 7:
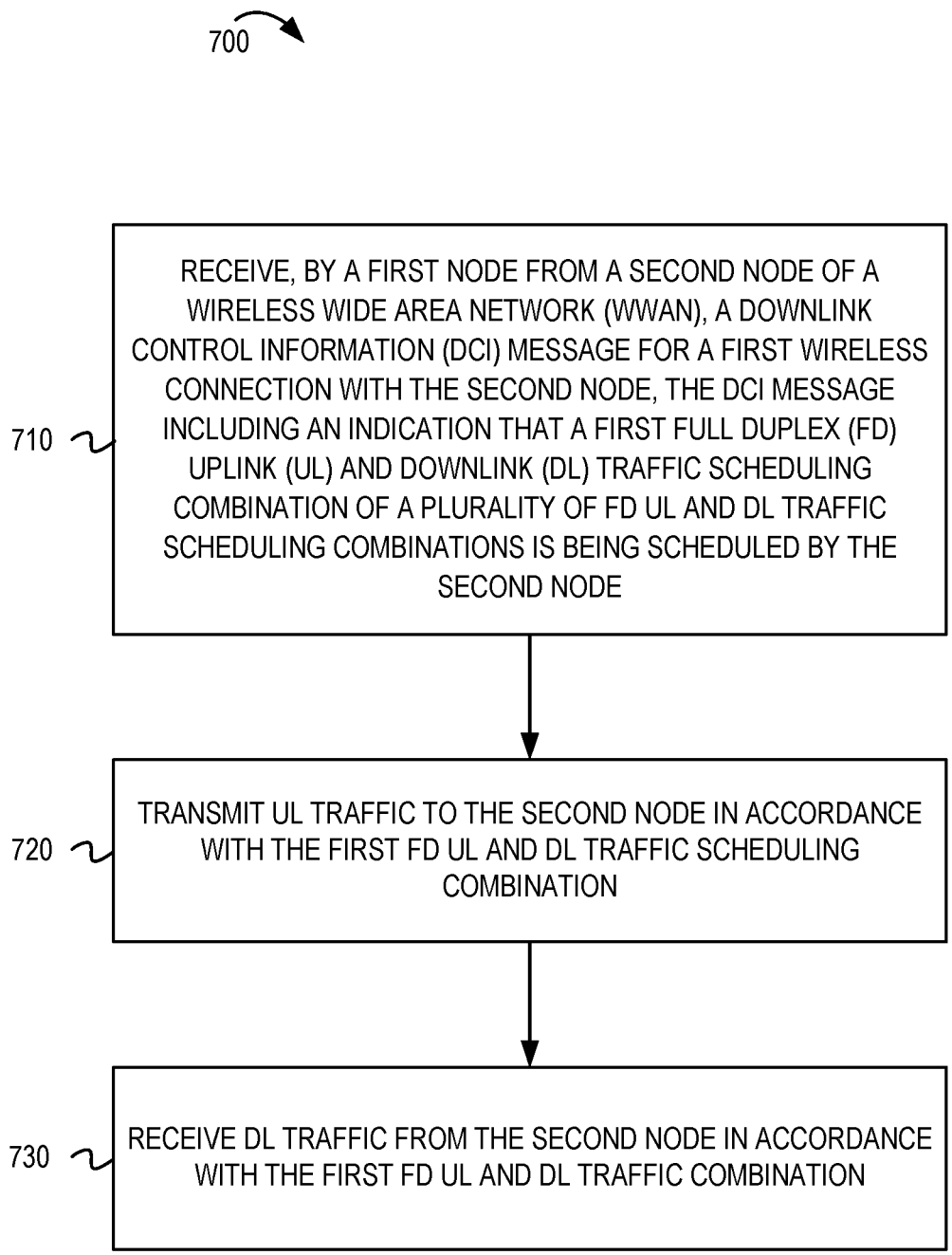
FIG. 7 depicts a flowchart with example operations performed by a first node of a wireless communication network for identifying a scheduled FD UL and DL traffic scheduling combination based on a DCI message received from a second node for differentiation of FD traffic.
Figure 8:
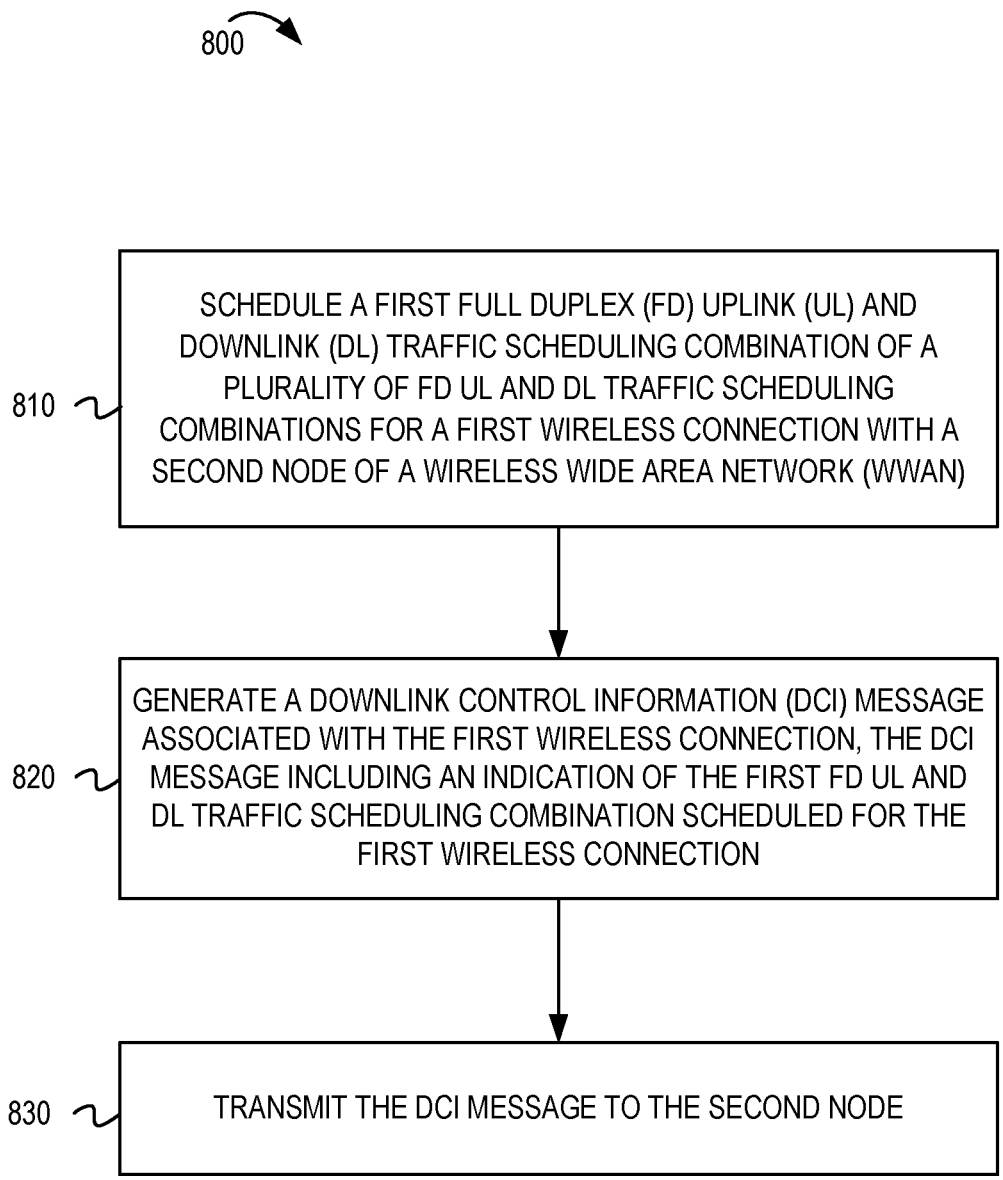
FIG. 8 depicts a flowchart with example operations performed by a first node of a wireless communication network for indicating a scheduled FD UL and DL traffic scheduling combination using a DCI message for differentiation of FD traffic.
Figure 9:
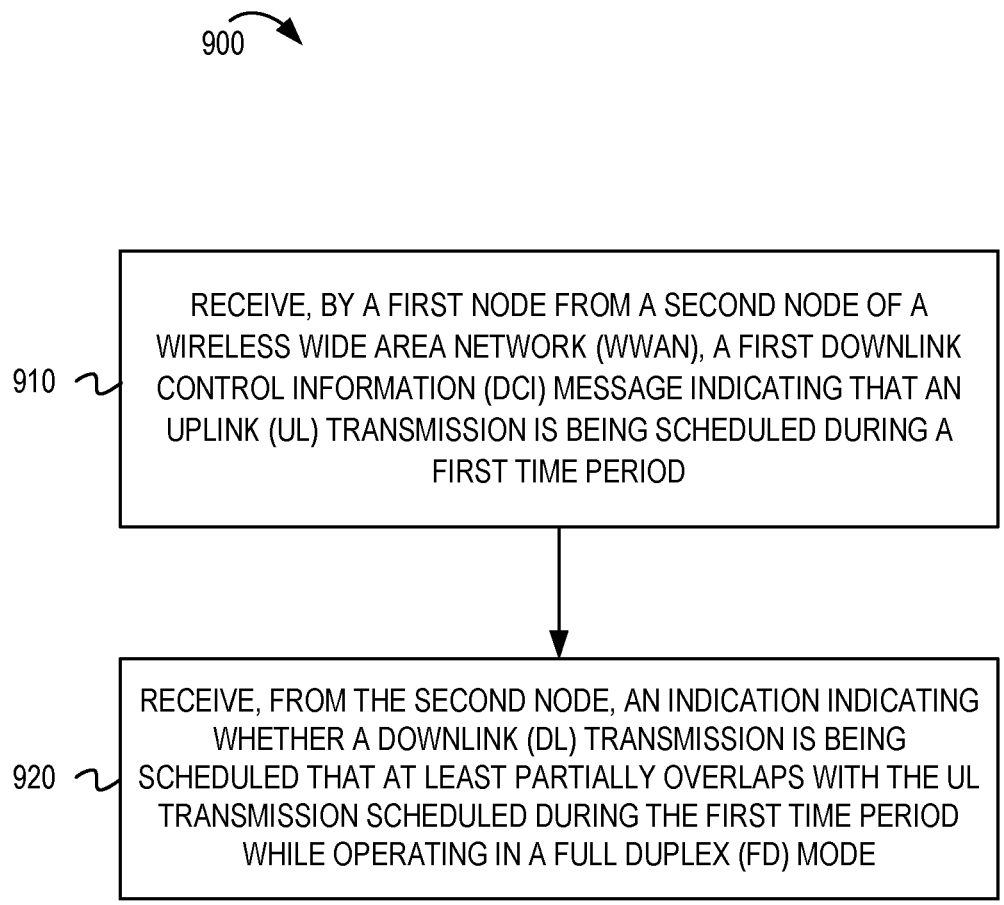
FIG. 9 depicts a flowchart with example operations performed by a first node of a wireless communication network for identifying whether HD or FD transmissions have been scheduled by a second node in order to determine whether to initiate a power save mode.

The stored program codes, when executed by the controller/processor 280 or other processors and modules at UE 120, may cause the UE 120 to perform operations described with respect to the process depicted by flowchart 700 of FIG. 7, the process depicted by flowchart 800 of FIG. 8, the process depicted by flowchart 900 of FIG. 9 or other processes as described herein, such as the processes described in FIGS. 3-6. The stored program codes, when executed by the controller/processor 240 or other processors and modules at BS 110, may cause the BS 110 to perform operations described with respect to the process depicted by flowchart 700 of FIG. 7, the process depicted by flowchart 800 of FIG. 8, the process depicted by flowchart 900 of FIG. 9 or other processes as described herein, such as the processes described in FIGS. 3-6. A scheduler 246 may schedule UEs for data transmission on the downlink, the uplink, or a combination thereof.

In some aspects, UE 120 may include means for performing the process depicted by flowchart 700 of FIG. 7, the process depicted by flowchart 800 of FIG. 8, the process depicted by flowchart 900 of FIG. 9 or other processes as described herein, such as the processes described in FIGS. 3-6. In some aspects, such means may include one or more components of UE 120 described in connection with FIG. 2.

In some aspects, BS 110 may include means for performing the process depicted by flowchart 700 of FIG. 7, the process depicted by flowchart 800 of FIG. 8, the process depicted by flowchart 900 of FIG. 9 or other processes as described herein, such as the processes described in FIGS. 3-6. In some aspects, such means may include one or more components of BS 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280.

Figure 3:
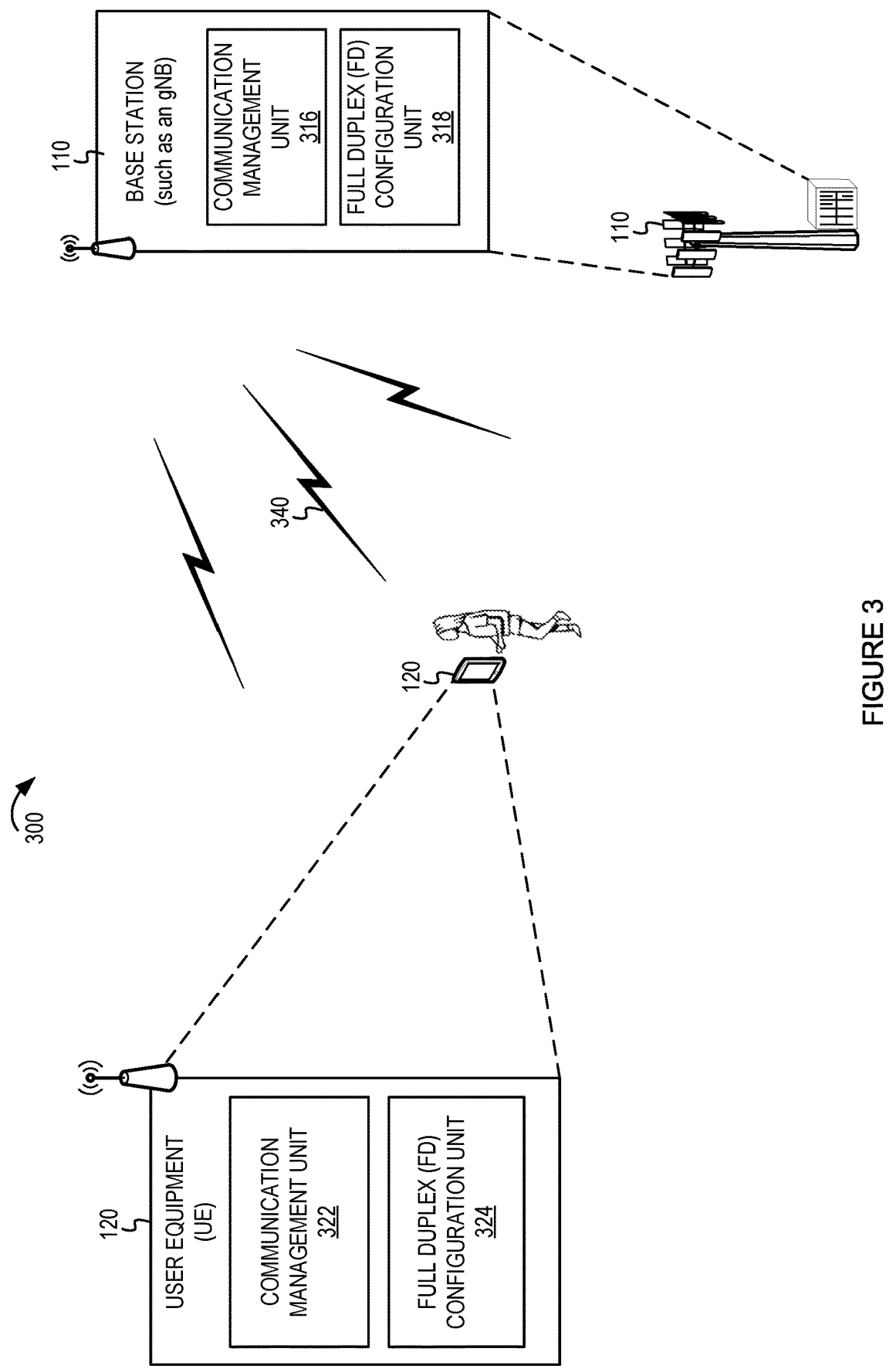
FIG. 3 shows a system diagram of an example wireless communication network including a BS and a UE that are configured to implement signaling for differentiation of a full duplex (FD) uplink (UL) and downlink (DL) traffic scheduling combination.

FIG. 3 shows a system diagram of an example wireless communication network including a BS and a UE that are configured to implement signaling for differentiation of a FD UL and DL traffic scheduling combination. The wireless communication network 300 shown in FIG. 3 is based on the example wireless communication network 100 described in FIG. 1. The wireless communication network 300 also may be referred to as a wide area network (WAN) or a wireless wide area network (WWAN). The wireless communication network 300 may include one or more nodes or network entities, such as a UE 120 and a BS 110. The UE 120 may be an example implementation of the UEs shown in FIGS. 1 and 2. The BS 110 may be an example implementation of the BS shown in FIGS. 1 and 2. As shown in FIG. 3, in some implementations, the BS 110 may be a gNB that may implement a 5G NR RAT. Although not shown for simplicity, the wireless communication network 300 may include one or more additional BSs and one or more additional UEs.

In some implementations, the BS 110 may be an example of a node or a network entity of the wireless communication network 300. The BS 110 may include a communication management unit 322 and an FD configuration unit 324. The FD configuration unit 324 may schedule and manage FD transmissions when the BS 110 is operating in a FD mode. The FD configuration unit 324 may manage and generate signaling, such as DCI message, for differentiation of a scheduled FD UL and DL traffic scheduling combination, as further described herein. The communication management unit 322 may work in conjunction with the FD configuration unit 324 to generate and transmit DCI messages that include an indication of a scheduled FD UL and DL traffic scheduling combination. Although not shown in FIG. 3 for simplicity, in some implementations, a node or a network entity of the wireless communication network 300, such as the BS 110, may include multiple disaggregated constituent components, such as a central unit (CU), distributed unit (DU), and a radio unit (RU).

In some implementations, the UE 120 may be an example of a node of the wireless communication network 300. The UE 120 also may be referred to as a wireless communication device. The UE 120 may include a communication management unit 316 and an FD configuration unit 318. The FD configuration unit 318 may manage and process signaling, such as DCI message, for differentiation of a scheduled FD UL and DL traffic scheduling combination, as further described herein. The communication management unit 316 may work in conjunction with the FD configuration unit 318 to receive and decode DCI messages that include an indication of a scheduled FD UL and DL traffic scheduling combination.

In some implementations, when the BS 110 schedules FD traffic, the BS 110 may indicate to the UE 120 which FD UL and DL traffic scheduling combination has being scheduled by the BS 110. The BS 110 may schedule one of various FD UL and DL traffic scheduling combinations for a wireless connection 340 with the UE 120. In some implementations, each of the various FD UL and DL traffic scheduling combinations may include at least one UL transmission and at least one DL transmission. For example, the various FD UL and DL traffic scheduling combinations may include a first FD UL and DL traffic scheduling combination that includes PDSCH DL traffic and PUSCH UL traffic, a second FD UL and DL traffic scheduling combination that includes semi-persistent scheduling (SPS) DL traffic and PUSCH UL traffic, a third FD UL and DL traffic scheduling combination that includes PDSCH DL traffic and configured grant (CG) UL traffic, and a fourth FD UL and DL traffic scheduling combination that includes SPS DL traffic and CG UL traffic. In some implementations, the BS 110 may select one of the various FD UL and DL traffic scheduling combinations and may schedule the selected FD UL and DL traffic scheduling combination for the wireless connection 340 with the UE 120. In some implementations, during a time period of FD mode operation having the scheduled FD UL and DL traffic scheduling combination, the UL transmission and the DL transmission associated with the scheduled FD UL and DL traffic scheduling combination may at least partially overlap during the time period. Since the UL and DL transmissions at least partially overlap during the time period, FD transmissions are achieved during the duration of the overlap of the UL and DL transmissions and HD transmissions are achieved when the UL and DL transmissions do not overlap.

In some implementation, the BS 110 may generate a DCI message that indicates to the UE 120 which FD UL and DL traffic scheduling combination has been scheduled by the BS 110. The DCI message may include an indication of the scheduled FD UL and DL traffic scheduling combination for the wireless connection 340 with the UE 120 to differentiate between the various FD UL and DL traffic scheduling combinations. The BS 110 may transmit the DCI message to the UE 120 via the wireless connection 340. The UE 120 may receive the DCI message from the BS 110 that includes the indication of the scheduled FD UL and DL traffic scheduling combination. The UE 120 may process or decode the DCI message to read or identify the indication of the scheduled FD UL and DL traffic scheduling combination. The UE 120 may differentiate between the various FD UL and DL traffic scheduling combinations and identify which FD UL and DL traffic scheduling combination was scheduled by the BS 110 based on the indication. Various types of indications of FD UL and DL traffic scheduling combination may be implemented by the BS 110 and the UE 120, as further described herein. In some implementations, the UE 120 may transmit UL traffic to the BS 110 and may receive DL traffic from the BS 110 in accordance with the scheduled FD UL and DL traffic scheduling combination.

In some implementations, the DCI message that includes the indication of the scheduled FD UL and DL traffic scheduling combination may have an existing DCI message format. In some implementations, when the DCI message has an existing DCI message format, the BS 110 may generate the DCI message that includes the indication of the scheduled FD UL and DL traffic scheduling combination by compressing one or more fields of the DCI message, reusing one or more fields of the DCI message, or using one or more reserved bits of the DCI message to indicate the scheduled FD UL and DL traffic scheduling combination. In some implementations, the BS 110 may compress one or more fields of the DCI message to use less bits per field and free up two or more bits for the indication of the scheduled FD UL and DL traffic scheduling combination. For example, after compressing one or more fields of the DCI message, two or more of the remaining bits may be used for the indication of the FD UL and DL traffic scheduling combination. In some implementations, the BS 110 may reuse one or more fields of the DCI message for the indication of the scheduled FD UL and DL traffic scheduling combination. For example, instead of using a field for one defined process or purpose (such as a HARQ process), the field may be reused for the indication of the FD UL and DL traffic scheduling combination. In some implementations, the BS 110 may use one or more reserved bits of the DCI message (such as two or three reserved bits) for the indication of the scheduled FD UL and DL traffic scheduling combination. In some implementations, the BS 110 may use one or more dedicated bits or one or more special field bits of the DCI message for the indication of the scheduled FD UL and DL traffic scheduling combination.

In some implementations, the indication of the scheduled FD UL and DL traffic scheduling combination may be a new identifier that indicates which one of the various FD UL and DL traffic scheduling combinations has been scheduled by the BS 110. The new identifier may be any number of bits, such as a 2-bit identifier or a 3-bit identifier. In some implementations, when a 2-bit identifier is used, the two bits may be used to indicate one of a first FD UL and DL traffic scheduling combination that includes PDSCH DL traffic and PUSCH UL traffic, a second FD UL and DL traffic scheduling combination that includes SPS DL traffic and PUSCH UL traffic, a third FD UL and DL traffic scheduling combination that includes PDSCH DL traffic and CG UL traffic, and a fourth FD UL and DL traffic scheduling combination that includes SPS DL traffic and CG UL traffic. In some implementations, when a 3-bit identifier is used, the three bits may be used to indicate one of a first FD UL and DL traffic scheduling combination that includes PDSCH DL traffic and PUSCH UL traffic, a second FD UL and DL traffic scheduling combination that includes SPS DL traffic and PUSCH UL traffic, a third FD UL and DL traffic scheduling combination that includes PDSCH DL traffic and CG UL traffic, a fourth FD UL and DL traffic scheduling combination that includes SPS DL traffic and CG UL traffic, a UL traffic only scheduling, and a DL traffic only scheduling. In some implementations, the 2-bit or 3-bit identifier may be defined on a mapping table that indicates which values of the different bits correspond to each of the various FD UL and DL traffic scheduling combinations, as further described in FIG. 4.

In some implementations, the BS 110 may generate the DCI message that includes the indication of the scheduled FD UL and DL traffic scheduling combination by using an RNTI to indicate a DL transmission of the scheduled FD UL and DL traffic scheduling combination and using one or more bits of the DCI message to indicate a UL transmission of the scheduled FD UL and DL traffic scheduling combination. For example, the DCI message may be scrambled by a single RNTI, which may be one of various available RNTIs that may be used to indicate the type of DL transmission of the scheduled FD UL and DL traffic scheduling combination. A first RNTI may be used to indicate the DL transmission is SPS traffic, and a second RNTI may be used to indicate the DL transmission is a PDSCH traffic. Also, one or more bits of the DCI message, such as one or more dedicated bits or reserved bits, may be used to indicate the UL transmission of the scheduled FD UL and DL traffic scheduling combination is CG traffic or PUSCH traffic.

In some implementations, the DCI message that includes the indication of the scheduled FD UL and DL traffic scheduling combination may have a new DCI message format. In some implementations, the new DCI message format may have a larger payload than the existing DCI message format. The existing DCI message format may not have available bits for the indication of the scheduled FD UL and DL traffic scheduling combination without compressing fields or reusing fields. In some implementations, the new DCI message format may include one or more dedicated fields or one or more dedicated bits in the payload that may be used for the indication of the scheduled FD UL and DL traffic scheduling combination.

In some implementations, the BS 110 may generate the DCI message that includes the indication of the scheduled FD UL and DL traffic scheduling combination by using an RNTI that indicates which one of the various FD UL and DL traffic scheduling combinations has been scheduled by the BS 110. For example, if the DCI message uses a first RNTI, this may indicate the BS 110 has scheduled a first FD UL and DL traffic scheduling combination (such as PDSCH DL traffic and PUSCH UL traffic). If the DCI message uses a second RNTI, this may indicate the BS 110 has scheduled a second FD UL and DL traffic scheduling combination (such as SPS DL traffic and PUSCH UL traffic). If the DCI message uses a third RNTI, this may indicate the BS 110 has scheduled a third FD UL and DL traffic scheduling combination (such as PDSCH DL traffic and CG UL traffic). If the DCI message uses a fourth RNTI, this may indicate the BS 110 has scheduled a fourth FD UL and DL traffic scheduling combination (such as SPS DL traffic and CG UL traffic). In some implementations, the RNTI that is selected based on the scheduled FD UL and DL traffic scheduling combination may be used to scramble the DCI message and indicate the scheduled FD UL and DL traffic scheduling combination. For example, the UE 120 may receive the DCI message that is scrambled with one of the RNTIs and may identify which FD UL and DL traffic scheduling combination has been scheduled by the BS 110 based on the RNTI. The BS 110 may use the selected RNTI to scramble a DCI message having the existing DCI message format or the new DCI message format having the larger payload.

In some implementations, the BS 110 may use two separate DCI messages to specify the allocations for FD DL and UL transmissions separately. For example, the BS 110 may transmit a first DCI message to specify the scheduled UL transmissions and a second DCI message to specify the scheduled DL transmissions. When operating in a FD mode, the scheduled UL transmission may at least partly overlap in time with the scheduled DL transmission. When operating in a HD mode, the UL transmission may not overlap in time with the DL transmission. In some implementations, when the BS 110 schedules a UL transmission during a first time period (such as a first time slot) using a first DCI message, the BS 110 may include an indication in the first DCI message that indicates whether there is a DL transmission scheduled during the first time period that may at least partially overlap in time with the UL transmission. The UE 120 may determine whether to initiate a power save mode that ceases monitoring for a DL transmission during the first time period based on whether the first DCI message includes the indication, as further described herein.

In some implementations, the BS 110 may use one or more bits of a DCI message as the indication of whether the BS 110 has scheduled a DL transmission during a time period that at least partially overlaps in time with a scheduled UL transmission. For example, at a time slot n-m, the BS 110 may schedule an UL transmission (such as a PUSCH transmission) that will be transmitted in the time slot n (which may be referred to as a first time slot) using a first DCI message. If the BS 110 schedules a DL transmission (such as a PDSCH transmission) that at least partially overlaps the UL transmission during the time slot n, the BS 110 may use the one or more bits of the first DCI message associated with the UL transmission to indicate the BS 110 has scheduled an overlapping (at least partially) DL transmission. During the time duration that the DL transmission overlaps with the UL transmission, the BS 110 and the UE 120 may be operating in an FD mode. For example, if the indication is one bit of the first DCI message, a binary '1' may be used to indicate an overlapping DL transmission. During the time duration that the DL transmission does not overlap with the UL transmission, the BS 110 and the UE 120 may be operating in an HD mode. The UE 120 may receive and decode the first DCI message, and identify the indication (such as the one or more bits) that indicates that the BS 110 has scheduled a DL transmission that at least partially overlaps the UL transmission. Since the BS 110 has scheduled an overlapping DL transmission during the time slot n, the UE 120 may continue monitoring for DL transmissions without entering a power save mode. For example, the UE 120 may continue monitoring for a PDCCH transmission including a second DCI message associated with the scheduled DL transmission. If the BS 110 does not schedule a DL transmission (such as a PDSCH transmission) during the time slot n, the BS 110 may use the one or more bits of the first DCI message associated with the UL transmission to indicate the BS 110 has not scheduled an overlapping DL transmission during the time slot n. For example, if the indication is one bit of the first DCI message, a binary '0' may be used to indicate the BS 110 has not scheduled an overlapping DL transmission. The UE 120 may receive and decode the first DCI message, and identify the indication that indicates that the BS 110 has not scheduled an overlapping DL transmission. The UE 120 may initiate a power save mode that ceases monitoring for a DL transmission during the time slot n, since the BS 110 has not scheduled an overlapping DL transmission during the time slot n. For example, the UE 120 may temporarily stop monitoring for a PDCCH transmission until after the time slot n.

In some implementations, the BS 110 may use one or more additional bits or an additional field of the same DCI message that schedules the PUSCH as the indication of a DL transmission configuration indication (TCI) state. The DL TCI state may be used for monitoring the DL transmission, such as the PDCCH, at the same time as the UL transmission, such as the PUSCH. For example, the DL TCI state may provide an indication of the beam that may be used by the BS 110 for transmitting the PDCCH.

In some implementations, the BS 110 may use a slot format in a DCI message as the indication of whether the BS 110 has scheduled a DL transmission during a time period that at least partially overlaps in time with a scheduled UL transmission. For example, the BS 110 may use an FD slot format in a first DCI message that schedules an UL transmission during the time period, or the BS 110 may use an FD slot format in a second DCI message that schedules a DL transmission during the time period. In some implementations, the FD slot format in one or more of the DCI messages may indicate to the UE 120 that the BS 110 has scheduled a DL transmission that at least partially overlaps with an UL transmission during a time period. When a scheduled DL transmission does not overlap with a scheduled UL transmission, the BS 110 may use an HD slot format in a first DCI message that schedules the UL transmission and in a second DCI message that schedules the DL transmission. The HD slot format in one or more DCI messages may indicate to the UE 120 that the BS 110 has scheduled a HD transmission (either a UL or DL transmission) that does not overlap with another scheduled transmission.

In some implementations, the BS 110 may use a UL beam indication in a DCI message that schedules an UL transmission to indicate a UL beam that will be used to transmit the UL transmission to the UE 120. For example, the BS 110 may use a UL beam indication in the DCI message that schedules an UL transmission (such as a PUSCH) during a time period (such as a time slot n, which also may be referred to as a first time slot) to indicate the UL beam that will be used to transmit the UL transmission to the UE 120. The UL beam indication may be an UL TCI state or spatial relation information in the DCI message. In some implementations, the UE 120 may receive the DCI message having the UL beam indication and determine whether the indicated UL beam can be paired with a default DL beam the UE 120 may use to receive a DL transmission (such as a PDSCH) from the BS 110 that at least partially overlaps with the scheduled UL transmission for FD operation. For example, the UE 120 may determine if there is sufficient beam separation between the UL beam and the default DL beam to avoid too much interference between the two beams during FD transmission. If there is too much interference between the two beams, the signal-to-interference-plus-noise ratio (SINR) may be too low for successful transmissions. In some implementations, if the default DL beam of the UE 120 cannot be paired with the UL beam indicated by the DCI message, the UE 120 may assume the BS 110 will not schedule a DL transmission during the time slot n (and thus assume HD transmission) and may initiate a power save mode that ceases monitoring for a DL transmission during the time slot n. In some implementations, if the default DL beam of the UE 120 can be paired with the UL beam indicated by the DCI message, the UE 120 may assume the BS 110 will schedule a DL transmission during the time slot n (and thus assume FD transmission) and may continue monitoring for a DL transmission during the time slot n (and may not enter the power save mode). Thus, the UL beam indication in the DCI message and the default DL beam may be used as indications of whether the BS 110 has scheduled a DL transmission during a time period (such as time slot n) that at least partially overlaps with a scheduled UL transmission.

In some implementations, the UE 120 may initiate a power save mode that ceases monitoring for a DCI message associated with a DL transmission during the duration of a scheduled UL transmission, such as a PUSCH. The UE 120 may assume that both an UL transmission and a DL transmission have been scheduled at the same time (such as during a first time slot or time slot n) and thus may assume the transmissions are FD transmission while operating in a FD mode. For example, the UE 120 may assume that both a PUSCH and a PDSCH have been scheduled at the same time during a time slot n and therefore the UE 120 may not monitor for a DCI message associated with the PDSCH during the time slot n. In some implementations, the BS 110 may be configured with a rule that if the BS 110 schedules an UL transmission (such as a PUSCH during a time slot n, the BS 110 may only schedule a DL transmission if it can be completed within the time slot n. Otherwise, the BS 110 may schedule the DL transmission outside of the time slot n. In some implementations, the UE 120 may be configured to implement a rule for initiating a power save mode that ceases monitoring for a DCI message associated with a DL transmission during the duration of a scheduled UL transmission, such as a PUSCH.

Figure 4:
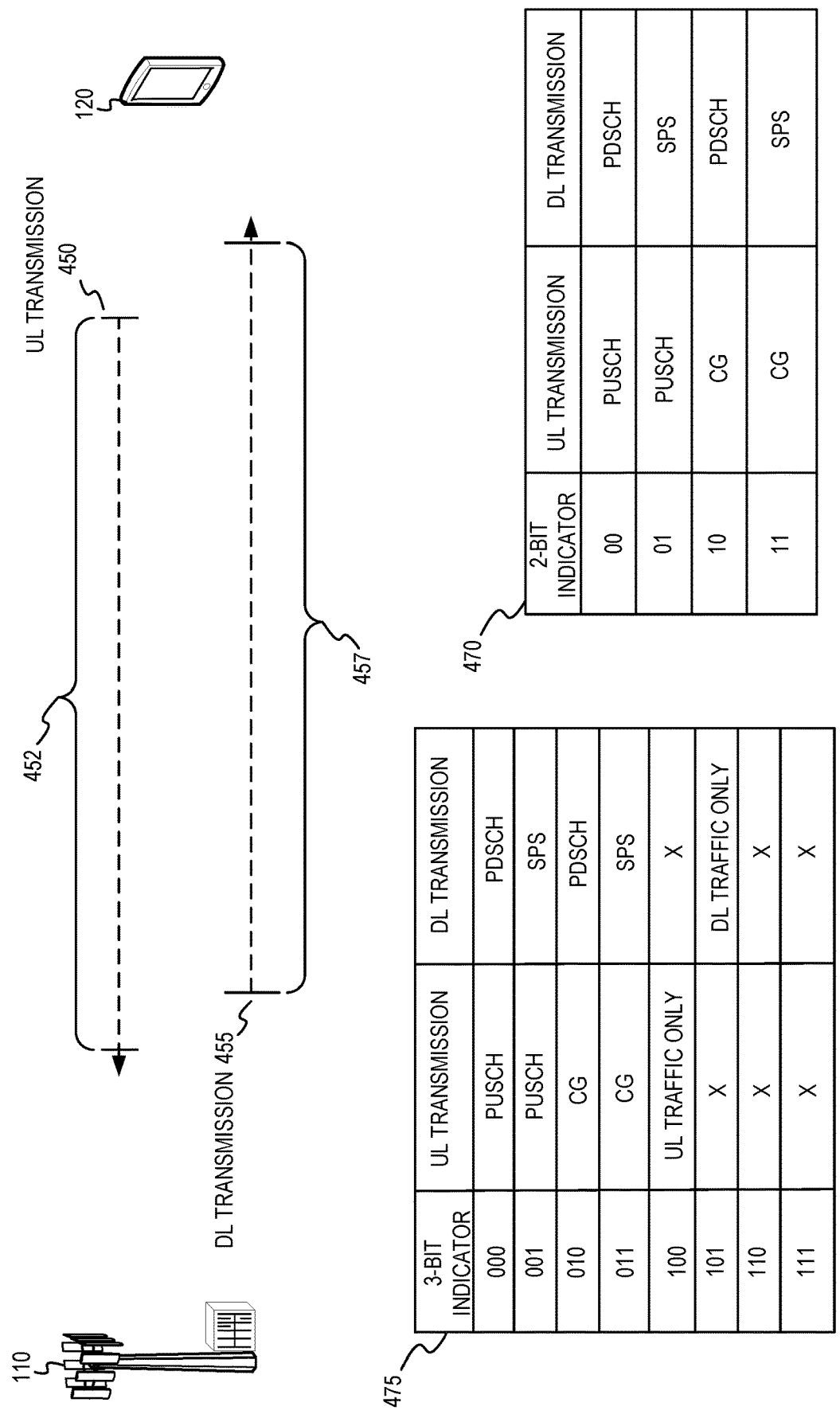
FIG. 4 shows a conceptual diagram of example mapping tables used in signaling from a BS to a UE that indicates a scheduled FD UL and DL traffic scheduling combination for differentiation of FD traffic.

FIG. 4 shows a conceptual diagram of example mapping tables used in signaling from a BS to a UE that indicates a scheduled FD UL and DL traffic scheduling combination for differentiation of FD traffic. FIG. 4 includes nodes or network entities of a wireless communication network, such as the BS 110 and the UE 120 that are described in FIG. 3.

In some implementations, the BS 110 may generate a DCI message that indicates to the UE 120 that FD transmissions have been scheduled by the BS 110 and also which one of the various FD UL and DL traffic scheduling combination has been scheduled by the BS 110, as described in FIG. 3. Each of the various FD UL and DL traffic scheduling combinations may specify a UL transmission and a DL transmission. For example, the various FD UL and DL traffic scheduling combinations may include a first FD UL and DL traffic scheduling combination that includes PDSCH DL traffic and PUSCH UL traffic, a second FD UL and DL traffic scheduling combination that includes SPS DL traffic and PUSCH UL traffic, a third FD UL and DL traffic scheduling combination that includes PDSCH DL traffic and CG UL traffic, and a fourth FD UL and DL traffic scheduling combination that includes SPS DL traffic and CG UL traffic. In some implementations, the DCI message may include an indication (such as a 2- or 3-bit identifier or indicator) of the scheduled FD UL and DL traffic scheduling combination to differentiate between the various FD UL and DL traffic scheduling combinations. Although a 2- or 3-bit identifier is shown, it is noted that in other implementations the identifier may include any number of bits, such as 4 bits.

Table 470 shows an example mapping table of a 2-bit indicator. The BS 110 may use a binary zero (or '00') as the 2-bit identifier to indicate the first FD UL and DL traffic scheduling combination has been scheduled, which includes PDSCH DL traffic and PUSCH UL traffic. The BS 110 may use a binary one (or '01') as the 2-bit identifier to indicate the second FD UL and DL traffic scheduling combination has been scheduled, which includes SPS DL traffic and PUSCH UL traffic. The BS 110 may use a binary two (or '10') as the 2-bit identifier to indicate the third FD UL and DL traffic scheduling combination has been scheduled, which includes PDSCH DL traffic and CG UL traffic. The BS 110 may use a binary three (or '11') as the 2-bit identifier to indicate the fourth FD UL and DL traffic scheduling combination has been scheduled, which includes SPS DL traffic and CG UL traffic.

Table 475 shows an example mapping table of a 3-bit indicator. The BS 110 may use a binary zero (or '000') as the 3-bit identifier to indicate the first FD UL and DL traffic scheduling combination has been scheduled, which includes PDSCH DL traffic and PUSCH UL traffic. The BS 110 may use a binary one (or '001') as the 3-bit identifier to indicate the second FD UL and DL traffic scheduling combination has been scheduled, which includes SPS DL traffic and PUSCH UL traffic. The BS 110 may use a binary two (or '010') as the 3-bit identifier to indicate the third FD UL and DL traffic scheduling combination has been scheduled, which includes PDSCH DL traffic and CG UL traffic. The BS 110 may use a binary three (or '011') as the 3-bit identifier to indicate the fourth FD UL and DL traffic scheduling combination has been scheduled, which includes SPS DL traffic and CG UL traffic. The BS 110 may use a binary four (or '100') as the 3-bit identifier to indicate only UL traffic has been scheduled by the BS 110, and may use a binary five (or '101') as the 3-bit identifier to indicate only DL traffic has been scheduled by the BS 110. The binary six (or '110') and the binary seven (or 111) option for the 3-bit identifier may be unused or reserved for other purposes.

As shown in FIG. 4, the BS 110 may use the DCI message to schedule a FD UL and DL traffic scheduling combination that includes a UL transmission 450 and a DL transmission 455. For example, the BS 110 may schedule the first FD UL and DL traffic scheduling combination that includes PDSCH DL traffic as the DL transmission 455 and PUSCH UL traffic as the UL transmission 450 during a FD mode. As shown, the duration 457 of the DL transmission 455 at least partially overlaps with the duration 452 of the UL transmission 450 during operation in the FD mode. When the UE 120 receives the DCI message that includes an indication (such as the 2- or 3-bit identifier) of the scheduled FD UL and DL traffic scheduling combination, the UE 120 can differentiate between the various FD UL and DL traffic scheduling combinations and enable the FD mode during at least the time period when the DL transmission 455 at least partially overlaps with the UL transmission 450.

In some implementations, the 2- or 3-bit identifier may be used with a new DCI message format, as described herein in FIG. 3. For example, two or more bits of the new DCI message format may be used for the 2- or 3-bit identifier. In some implementations, the 2- or 3-bit identifier may be used with the existing DCI message format. For example, two or more bits of the existing DCI message format may be reused as the 2- or 3-bit identifier. As another example, two or more reserved bits of the existing DCI message format may be used as the 2- or 3-bit identifier. As another example, two or more remaining bits after compressing one or more fields of the existing DCI message format may be used as the 2- or 3-bit identifier.

FIG. 5 shows an example message flow that shows signaling from a BS to a UE that indicates a scheduled FD UL and DL traffic scheduling combination using a DCI message for differentiation of FD traffic. The message flow diagram 500 includes network nodes or network entities, such as the BS 110 and the UE 120 that are described in FIG. 3.

At 505, the BS 110 may select one of the various FD UL and DL traffic scheduling combinations in order to schedule FD transmissions that may be performed with the UE 120 during an FD mode. For example, the BS 110 may select the first FD UL and DL traffic scheduling combination, the second FD UL and DL traffic scheduling combination, the third FD UL and DL traffic scheduling combination, or the FD UL and DL traffic scheduling combination, as described in FIGS. 3-4.

At 510, the BS 110 may generate a DCI message and transmit the DCI message to the UE 120. The DCI message may include an indication of the scheduled FD UL and DL traffic scheduling combination. The indication of the scheduled FD UL and DL traffic scheduling combination may indicate both the scheduled UL transmission and the scheduled DL transmission in a single DCI message. In some implementations, the indication may include one or more bits or RNTI information, as described in FIGS. 3-4.

At 515, the UE 120 may receive the DCI message from the BS 110 and process the DCI message. The UE 120 may decode the DCI message to select, identify, or determine the indication of the FD UL and DL traffic scheduling combination. The UE 120 may identify which one of the various FD UL and DL traffic scheduling combinations has been scheduled by the BS 110 based on the indication. In some implementations, the indication may include one or more bits or RNTI information, as described in FIGS. 3-4. For example, the UE 120 may receive, detect, identify, or determine one or more bits that indicate the FD UL and DL traffic scheduling combination is being scheduled by the BS 110. As another example, the UE 120 may receive, detect, identify, or determine one or more fields that indicate the FD UL and DL traffic scheduling combination is being scheduled by the BS 110. As another example, when the received DCI message has a DCI format with a larger payload than existing DCI formats, the UE 120 may receive, detect, identify, or determine one or more dedicated bits that indicate the FD UL and DL traffic scheduling combination is being scheduled by the BS 110. As another example, when the received DCI message has a DCI format with a larger payload than existing DCI formats, the UE 120 may receive, detect, identify, or determine one or more dedicated fields that indicate the FD UL and DL traffic scheduling combination is being scheduled by the BS 110. As another example, the UE 120 may receive, detect, identify, or determine an RNTI that indicates a DL transmission of the FD UL and DL traffic scheduling combination is being scheduled by the BS 110, and may receive, detect, identify, or determine one or more bits that indicate a UL transmission of the FD UL and DL traffic scheduling combination is being scheduled by the BS 110. As another example, the UE 120 may receive, detect, identify, or determine an RNTI that indicates which one of the plurality of FD UL and DL traffic scheduling combinations is being scheduled by the BS 110.

At 520, the UE 120 may transmit the UL transmission associated with the scheduled FD UL and DL traffic scheduling combination. For example, if the DCI message indicated the BS 110 scheduled the first FD UL and DL traffic scheduling combination, the UE 120 may transmit a PUSCH. As another example, if the DCI message indicated the BS 110 scheduled the third FD UL and DL traffic scheduling combination, the UE 120 may transmit a CG.

At 525, the BS 110 may transmit the DL transmission associated with the scheduled FD UL and DL traffic scheduling combination. The DL transmission that is transmitted by the BS 110 may at least partly overlap in time with the UL transmission that is transmitted by the UE 120 while operating in an FD mode. For example, if the DCI message indicated the BS 110 scheduled the first FD UL and DL traffic scheduling combination, the BS 110 may transmit a PDSCH that at least partly overlaps with the PUSCH transmission. As another example, if the DCI message indicated the BS 110 scheduled the second FD UL and DL traffic scheduling combination, the UE 120 may transmit an SPS that at least partially overlaps with the PUSCH transmission.

At 530, the BS 110 may receive the UL transmission from the UE 120. When operating in a FD mode, the reception of the UL transmission by the BS 110 may at least partly overlap in time with the transmission of the DL transmission to the UE 120.

At 535, the UE 120 may receive the DL transmission from the BS 110. When operating in a FD mode, the reception of the DL transmission by the UE 120 may at least partly overlap in time with the transmission of the UL transmission to the BS 110.

FIG. 6 shows an example message flow that shows signaling from a BS to a UE that indicates whether HD or FD transmissions have been scheduled which may enable the UE to implement a power save mode. The message flow diagram 600 includes network nodes or network entities, such as the BS 110 and the UE 120 that are described in FIG. 3.

At 605, the BS 110 may generate a first DCI message that schedules an UL transmission and that indicates whether a DL transmission is being scheduled that at least partially overlaps in time with the UL transmission during a time period (such as a time slot n). If the first DCI message indicates that only the UL transmission is being scheduled during the time period, the BS 110 and the UE 120 may operation in a HD mode during that time period. If the first DCI message indicates that a DL transmission is being scheduled that at least partially overlaps with the UL transmission during the time period, the BS 110 and the UE 120 may operation in a FD mode during the duration of the overlap. In some implementations, the indication that indicates whether a DL transmission is being scheduled that at least partially overlaps with the UL transmission during the time period may include one or more bits of the first DCI message, a slot format indicated by the first DCI message, or a UL beam indication included in the first DCI message, as described in FIG. 3.

At 610, the BS 110 may transmit the DCI message that includes an indication of whether a DL transmission is being scheduled that at least partially overlaps with the UL transmission during a time period (such as a time slot n). In some implementations, if the BS 110 schedules a DL transmission that at least partially overlaps with a UL transmission during the time period, the BS 110 also may transmit a second DCI message (not shown) to the UE 120. If the BS 110 does not schedule a DL transmission that at least partially overlaps with the UL transmission during the time period, the BS 110 does not transmit a second DCI message to the UE 120.

At 615, the UE 120 may receive the first DCI message from the BS 110 and process the first DCI message. The UE 120 may decode the first DCI message to select, identify, or determine the indication of whether a DL transmission is being scheduled that at least partially overlaps with a UL transmission during the time period. In some implementations, if the first DCI message indicates that overlapping UL and DL transmissions are not being scheduled, the UE 120 may initiate a power save mode during the time period that ceases monitoring for a DL transmission during the time period, as shown in FIG. 6. In some implementations, if the first DCI message indicates that overlapping UL and DL transmissions are being scheduled, the UE 120 may continue monitoring for the DL transmission during the time period.

At 620, during the time period (such as the time slot n), the UE 120 may initiate a power save mode during the time period that ceases monitoring for a DL transmission during the time period.

At 625, during the time period (such as the time slot n), the UE 120 may transmit the UL transmission (such as a PUSCH) to the BS 110. Since FD transmissions were not scheduled by the BS 110, the BS 110 and the UE 120 may operation in a HD mode.

At 630, the BS 110 may receive the UL transmission (such as a PUSCH) from the UE 120 during the time period.

FIG. 7 depicts a flowchart 700 with example operations performed by a first node of a wireless communication network for identifying a scheduled FD UL and DL traffic scheduling combination based on a DCI message received from a second node for differentiation of FD traffic. In some implementations, the first node may be a UE (such as UE 120 described in FIG. 3) and the second node may be a BS (such as the BS 110 described in FIG. 3) or a component of a BS, such as a central unit (CU), a distributed unit (DU), or a radio unit (RU) implemented in a disaggregated RAN (D-RAN) or open RAN (O-RAN) configuration.

At block 710, a first node may receive, from a second node of a WWAN, a DCI message for a first wireless connection with the second node. The DCI message may include an indication that a first FD UL and DL traffic scheduling combination of a plurality of FD UL and DL traffic scheduling combinations is being scheduled by the second node.

At block 720, the first node may transmit UL traffic to the second node in accordance with the first FD UL and DL traffic scheduling combination.

At block 730, the first node may receive DL traffic from the second node in accordance with the first FD UL and DL traffic scheduling combination.

FIG. 8 depicts a flowchart 800 with example operations performed by a first node of a wireless communication network for indicating a scheduled FD UL and DL traffic scheduling combination using a DCI message for differentiation of FD traffic. In some implementations, the first node may be a BS (such as the BS 110 described in FIG. 3, or a component of a BS, such as a CU, a DU, or a RU implemented in a D-RAN or O-RAN configuration) and the second node may be a UE (such as UE 120 described in FIG. 3).

At block 810, a first node may schedule a first FD UL and DL traffic scheduling combination of a plurality of FD UL and DL traffic scheduling combinations for a first wireless connection with a second node of a WWAN.

At block 820, the first node may generate a DCI message associated with the first wireless connection. The DCI message may include an indication of the first FD UL and DL traffic scheduling combination scheduled for the first wireless connection.

At block 830, the first node may transmit the DCI message to a second node.

FIG. 9 depicts a flowchart 900 with example operations performed by a first node of a wireless communication network for identifying whether HD or FD transmissions have been scheduled by a second node in order to determine whether to initiate a power save mode. In some implementations, the first node may be a UE (such as UE 120 described in FIG. 3) and the second node may be a BS (such as the BS 110 described in FIG. 3), or a component of a BS, such as a CU, a DU, or a RU implemented in a D-RAN or O-RAN configuration.

At block 910, a first node may receive, from a second node of a WWAN, a first DCI message indicating that an UL transmission is being scheduled during a first time period.

At block 920, the first node may receive, from the second node, an indication indicating whether a DL transmission is being scheduled that at least partially overlaps with the UL transmission scheduled during the first time period while operating in a FD mode.

In some implementations, in response to the indication indicating that a DL transmission is not scheduled during the first time period, the first node may initiate a power save mode during the first time period that ceases monitoring for a DL transmission during the first time period. In response to the indication indicating that a DL transmission is scheduled during the first time period, the first node may monitor for a DL transmission during the first time period.

Figure 10:
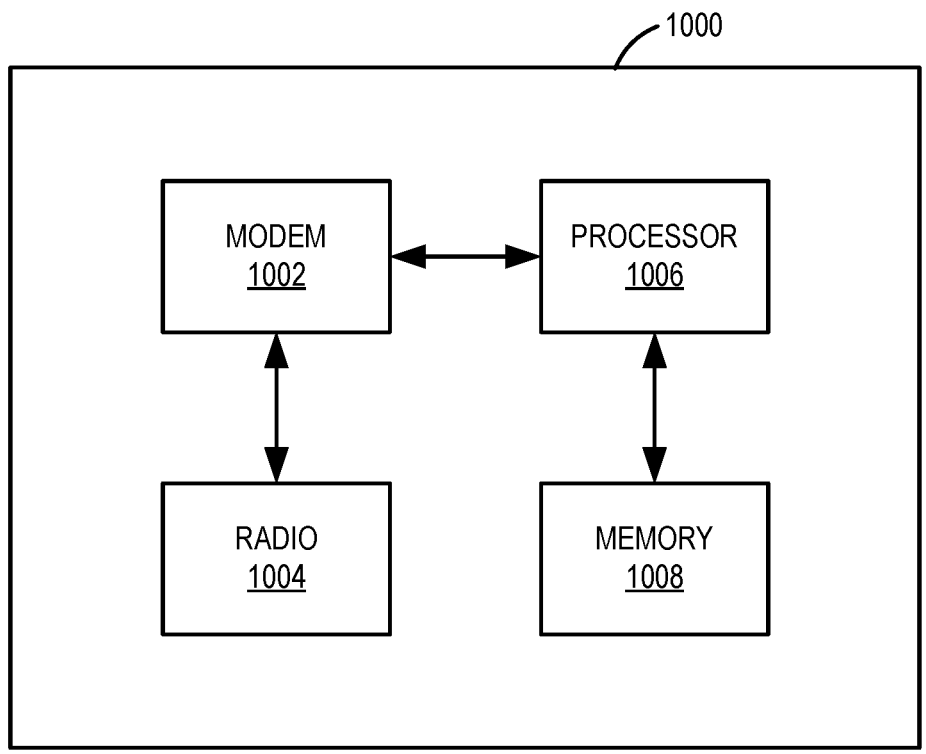
FIG. 10 shows a block diagram of an example wireless communication apparatus.

FIG. 10 shows a block diagram of an example wireless communication apparatus 1000. In some implementations, the wireless communication apparatus 1000 can be an example of a device for use in a UE, such as the UE 120 described with reference to FIG. 3. In some implementations, the wireless communication apparatus 1000 can be an example of a device for use in a BS, such as the BS 110 described with reference to FIG. 3. The wireless communication apparatus 1000 is capable of transmitting (or outputting for transmission) and receiving wireless communications.

The wireless communication apparatus 1000 can be, or can include, a chip, system on chip (SoC), chipset, package or device. The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SoC may further include other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (such as, for example, silicon).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high speed communication circuitry and packaged in close proximity, such as on a single motherboard or in a single mobile communication device. The proximity of the SoCs facilitates high speed communications and the sharing of memory and resources.

The term "multicore processor" is used herein to refer to a single IC chip or chip package that contains two or more independent processing cores (for example a CPU core, IP core, GPU core, among other examples) configured to read and execute program instructions. An SoC may include multiple multicore processors, and each processor in an SoC may be referred to as a core. The term "multiprocessor" may be used herein to refer to a system or device that includes two or more processing units configured to read and execute program instructions.

The wireless communication apparatus 1000 may include one or more modems 1002. In some implementations, the one or more modems 1002 (collectively "the modem 1002") may include a WWAN modem (for example, a 3GPP 4G LTE or 5G compliant modem). In some implementations, the wireless communication apparatus 1000 also includes one or more radios 1004 (collectively "the radio 1004"). In some implementations, the wireless communication apparatus 1000 further includes one or more processors, processing blocks or processing elements (collectively "the processor 1006") and one or more memory blocks or elements (collectively "the memory 1008").

The modem 1002 can include an intelligent hardware block or device such as, for example, an application-specific integrated circuit (ASIC) among other possibilities. The modem 1002 is generally configured to implement a PHY layer. For example, the modem 1002 is configured to modulate packets and to output the modulated packets to the radio 1004 for transmission over the wireless medium. The modem 1002 is similarly configured to obtain modulated packets received by the radio 1004 and to demodulate the packets to provide demodulated packets. In addition to a modulator and a demodulator, the modem 1002 may further include digital signal processing (DSP) circuitry, automatic gain control (AGC), a coder, a decoder, a multiplexer and a demultiplexer. For example, while in a transmission mode, data obtained from the processor 1006 is provided to a coder, which encodes the data to provide encoded bits. The encoded bits are mapped to points in a modulation constellation (using a selected MCS) to provide modulated symbols. The modulated symbols may be mapped to a number NSS of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 1004. In implementations involving beamforming, the modulated symbols in the respective spatial streams are precoded via a steering matrix prior to their provision to the IFFT block.

While in a reception mode, digital signals received from the radio 1004 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 1006) for processing, evaluation, or interpretation.

The radio 1004 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication apparatus 1000 can include, or be coupled with, multiple transmit antennas (each with a corresponding transmit chain) and multiple receive antennas (each with a corresponding receive chain). The symbols output from the modem 1002 are provided to the radio 1004, which transmits the symbols via the coupled antennas. Similarly, symbols received via the antennas are obtained by the radio 1004, which provides the symbols to the modem 1002.

The processor 1006 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1006 processes information received through the radio 1004 and the modem 1002, and processes information to be output through the modem 1002 and the radio 1004 for transmission through the wireless medium. In some implementations, the processor 1006 may generally control the modem 1002 to cause the modem to perform various operations described throughout.

The memory 1008 can include tangible storage media such as random-access memory (RAM) or read-only memory (ROM), or combinations thereof. The memory 1008 also can store non-transitory processor- or computer-executable software (SW) code containing instructions that, when executed by the processor 1006, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the processor 1006 and the memory 1008 of the wireless communication apparatus 1000 may be referred to as a processing system. A processing system may generally refer to a system or series of machines or components that receives inputs and processes the inputs to produce a set of outputs (which may be passed to other systems or components of, for example, one of the UEs 120 or one of the BSs 110). In some implementations, the processing system may include the processor 1006, the memory 1008, and one or more other components of the wireless communication apparatus 1000, such as the modem 1002.

In some implementations, the processing system of a UE 120 may interface with other components of the UE 120, and may process information received from other components (such as inputs or signals), output information to other components, etc. For example, a chip or modem of the UE 120 (such as the wireless communication apparatus 1000) may include a processing system, a first interface to receive or obtain information, and a second interface to output, transmit or provide information. In some cases, the first interface may refer to an interface between the processing system of the chip or modem and a receiver, such that the UE 120 may receive information or signal inputs, and the information may be passed to the processing system. In some cases, the second interface may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the processing system of a BS 110 may interface with other components of the BS 110, and may process information received from other components (such as inputs or signals), output information to other components, etc. For example, a chip or modem of the BS 110 (such as the wireless communication apparatus 1000) may include a processing system, a first interface to receive or obtain information, and a second interface to output, transmit or provide information. In some cases, the first interface may refer to an interface between the processing system of the chip or modem and a receiver, such that the BS 110 may receive information or signal inputs, and the information may be passed to the processing system. In some cases, the second interface may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

Figure 11:
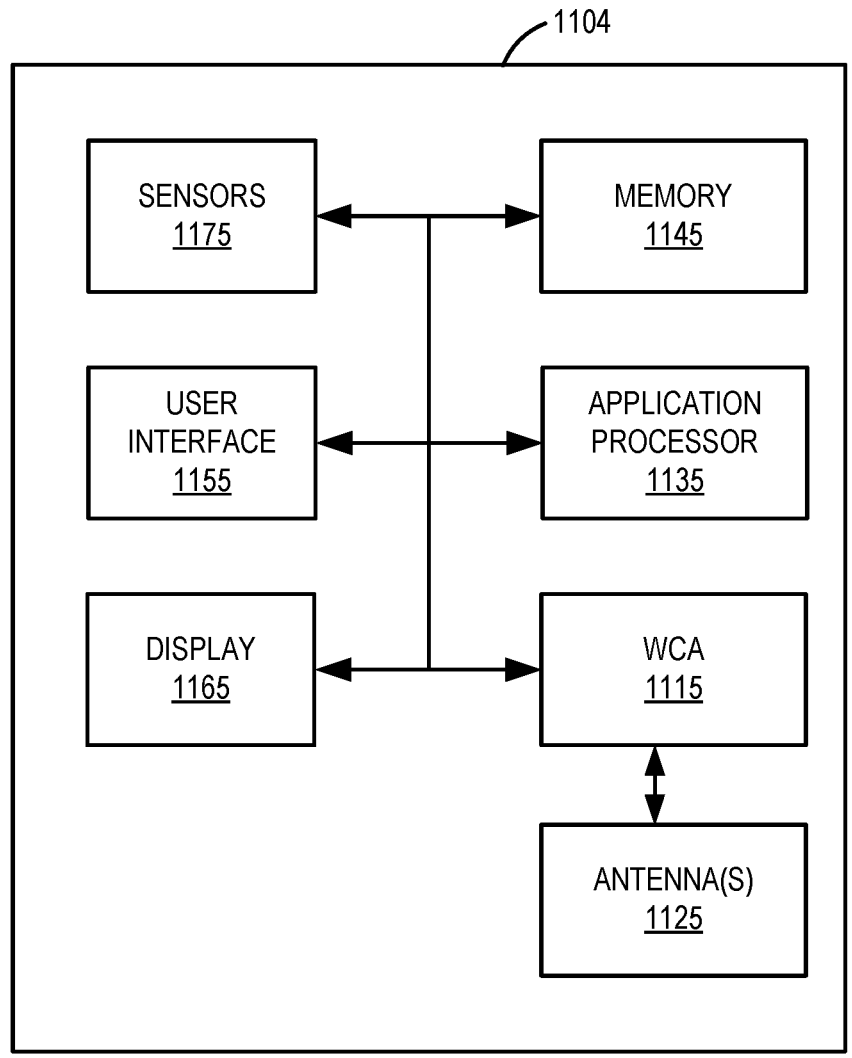
FIG. 11 shows a block diagram of an example mobile communication device.

FIG. 11 shows a block diagram of an example mobile communication device 1104. For example, the mobile communication device 1104 can be an example implementation of the UE 120 described herein. The mobile communication device 1104 includes a wireless communication apparatus (WCA) 1115. For example, the WCA 1115 may be an example implementation of the wireless communication apparatus 1000 described with reference to FIG. 10. The mobile communication device 1104 also includes one or more antennas 1125 coupled with the WCA 1115 to transmit and receive wireless communications. The mobile communication device 1104 additionally includes an application processor 1135 coupled with the WCA 1115, and a memory 1145 coupled with the application processor 1135. In some implementations, the mobile communication device 1104 further includes a UI 1155 (such as a touchscreen or keypad) and a display 1165, which may be integrated with the UI 1155 to form a touchscreen display. In some implementations, the mobile communication device 1104 may further include one or more sensors 1175 such as, for example, one or more inertial sensors, accelerometers, temperature sensors, pressure sensors, or altitude sensors. Ones of the aforementioned components can communicate with other ones of the components directly or indirectly, over at least one bus. The mobile communication device 1104 further includes a housing that encompasses the WCA 1115, the application processor 1135, the memory 1145, and at least portions of the antennas 1125, UI 1155, and display 1165.

FIGS. 1-11 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options.

Clause 1. One aspect of the subject matter described in this disclosure can be implemented in a method for wireless communication performed by a first node. The method may include receiving, from a second node of a WWAN, a DCI message for a first wireless connection with the second node. The DCI message may include an indication that a first FD UL and DL traffic scheduling combination of a plurality of FD UL and DL traffic scheduling combinations is being scheduled by the second node. The method may include transmitting UL traffic to the second node in accordance with the first FD UL and DL traffic scheduling combination, and receiving DL traffic from the second node in accordance with the first FD UL and DL traffic scheduling combination.

Clause 2. The method of clause 1, where the plurality of FD UL and DL traffic scheduling combinations may include PDSCH DL traffic and PUSCH UL traffic, SPS DL traffic and PUSCH UL traffic, PDSCH DL traffic and CG UL traffic, and SPS DL traffic and CG UL traffic.

Clause 3. The method of any one or more of clauses 1-2, where the method of receiving the DCI message further includes receiving one or more bits indicating the first FD UL and DL traffic scheduling combination is being scheduled by the second node, or receiving one or more fields indicating the first FD UL and DL traffic scheduling combination is being scheduled by the second node.

Clause 4. The method of any one or more of clauses 1-3, where the one or more bits may be one or more dedicated or reserved bits of the received DCI message, or the one or more fields may be one or more dedicated or reserved fields of the received DCI message.

Clause 5. The method of any one or more of clauses 1-4, where the one or more bits may be one or more reserved bits of the received DCI message having an existing DCI format, the one or more fields may be one or more reused fields of the received DCI message having an existing DCI format, or the one or more fields may be one or more additional fields of the received DCI message having an existing DCI format with one or more compressed fields.

Clause 6. The method of any one or more of clauses 1-5, where the method of receiving the DCI message further includes receiving one or more dedicated bits indicating the first FD UL and DL traffic scheduling combination is being scheduled by the second node, the received DCI message having a DCI format with a larger payload than existing DCI formats, or receiving one or more dedicated fields indicating the first FD UL and DL traffic scheduling combination is being scheduled by the second node, the received DCI message having a DCI format with a larger payload than existing DCI formats.

Clause 7. The method of any one or more of clauses 1-6, where the method of receiving the DCI message further includes receiving a first RNTI indicating a DL transmission of the first FD UL and DL traffic scheduling combination is being scheduled by the second node, and receiving one or more bits indicating a UL transmission of the first FD UL and DL traffic scheduling combination is being scheduled by the second node.

Clause 8. The method of any one or more of clauses 1-7, where the method of receiving the DCI message further includes receiving an RNTI indicating which one of the plurality of FD UL and DL traffic scheduling combinations is being scheduled by the second node.

Clause 9. The method of any one or more of clauses 1-8, where a first RNTI may indicate the first FD UL and DL traffic scheduling combination of the plurality of FD UL and DL traffic scheduling combinations is being scheduled by the first node, a second RNTI may indicate a second FD UL and DL traffic scheduling combination of the plurality of FD UL and DL traffic scheduling combinations is being scheduled by the first node, a third RNTI may indicate a third FD UL and DL traffic scheduling combination of the plurality of FD UL and DL traffic scheduling combinations is being scheduled by the first node, and a fourth RNTI may indicate a fourth FD UL and DL traffic scheduling combination of the plurality of FD UL and DL traffic scheduling combinations is being scheduled by the first node.

Clause 10. Another aspect of the subject matter described in this disclosure can be implemented in a method for wireless communication performed by a first node. The method may include scheduling a first FD UL and DL traffic scheduling combination of a plurality of FD UL and DL traffic scheduling combinations for a first wireless connection with a second node of a WWAN. The method may include generating a DCI message associated with the first wireless connection. The DCI message may include an indication of the first FD UL and DL traffic scheduling combination scheduled for the first wireless connection. The method may include transmitting the DCI message to the second node.

Clause 11. The method of clause 10, where the plurality of FD UL and DL traffic scheduling combinations may include PDSCH DL traffic and PUSCH UL traffic, SPS DL traffic and PUSCH UL traffic, PDSCH DL traffic and CG UL traffic, and SPS DL traffic and CG UL traffic.

Clause 12. The method of any one or more of clauses 10-11, where the method of generating the DCI message including the indication of the first FD UL and DL traffic scheduling combination may further include generating the DCI message by at least one of compressing one or more fields of the DCI message for scheduling DL and UL traffic via the DCI message, reusing one or more fields of the DCI message for scheduling DL and UL traffic via the DCI message, and using one or more reserved bits of the DCI message for scheduling DL and UL traffic via the DCI message.

Clause 13. The method of any one or more of clauses 10-12, where generating the DCI message including the indication of the first FD UL and DL traffic scheduling combination may further include generating the DCI message using an existing DCI format.

Clause 14. The method of any one or more of clauses 10-13, where generating the DCI message including the indication of the first FD UL and DL traffic scheduling combination may further include generating the DCI message by at least one of using one or more dedicated bits of a DCI format having a larger payload than existing DCI formats for scheduling DL and UL traffic via the DCI message, and using one or more dedicated fields of a DCI format having a larger payload than existing DCI formats for scheduling DL and UL traffic via the DCI message.

Clause 15. The method of any one or more of clauses 10-14, where the indication of the first FD UL and DL traffic scheduling combination may include one of one or more dedicated fields or bits of the DCI message, and one or more reserved fields or bits of the DCI message.

Clause 16. The method of any one or more of clauses 10-15, where generating the DCI message including the indication of the first FD UL and DL traffic scheduling combination may further include generating the DCI message by using a first RNTI to indicate a DL transmission of the first FD UL and DL traffic scheduling combination, and using one or more bits of the DCI message to indicate a UL transmission of the first FD UL and DL traffic scheduling combination.

Clause 17. The method of any one or more of clauses 10-16, where the DCI message including the indication of the first FD UL and DL traffic scheduling combination may include the DCI message including an RNTI that indicates which one of the plurality of FD UL and DL traffic scheduling combinations is being scheduled by the first node.

Clause 18. The method of any one or more of clauses 10-17, where a first RNTI may indicate the first FD UL and DL traffic scheduling combination of the plurality of FD UL and DL traffic scheduling combinations is being scheduled by the first node, a second RNTI may indicate a second FD UL and DL traffic scheduling combination of the plurality of FD UL and DL traffic scheduling combinations is being scheduled by the first node, a third RNTI may indicate a third FD UL and DL traffic scheduling combination of the plurality of FD UL and DL traffic scheduling combinations is being scheduled by the first node, and a fourth RNTI may indicate a fourth FD UL and DL traffic scheduling combination of the plurality of FD UL and DL traffic scheduling combinations is being scheduled by the first node.

Clause 19. Another aspect of the subject matter described in this disclosure can be implemented in a method for wireless communication performed by a first node. The method may include receiving, from a second node of a WWAN, a first DCI message indicating that an UL transmission is being scheduled during a first time period. The method may include receiving, from the second node, an indication indicating whether a DL transmission is being scheduled that at least partially overlaps with the UL transmission scheduled during the first time period while operating in an FD mode.

Clause 20. The method of clause 19, in response to the indication indicating that a DL transmission is not scheduled during the first time period, further including initiating a power save mode during the first time period that ceases monitoring for a DL transmission during the first time period.

Clause 21. The method of any one or more of clauses 19-20, in response to the indication indicating that a DL transmission is scheduled during the first time period, further including monitoring for a DL transmission during the first time period.

Clause 22. The method of any one or more of clauses 19-21, where the indication indicating whether a DL transmission is scheduled that at least partially overlaps with the UL transmission scheduled during the first time period may include one or more bits in the first DCI message received from the second node.

Clause 23. The method of any one or more of clauses 19-22, further including receiving one or more additional bits in the first DCI message received from the second node. The one or more additional bits may indicate a DL transmission configuration indication (TCI) state.

Clause 24. The method of any one or more of clauses 19-23, where the indication indicating whether a DL transmission is scheduled that at least partially overlaps with the UL transmission scheduled during the first time period may include a slot format indicated by the first DCI message received from the second node or by a second DCI message received from the second node. The second DCI message may indicate that the DL transmission is being scheduled by the second node.

Clause 25. The method of any one or more of clauses 19-24, where the indication indicating whether a DL transmission is scheduled that at least partially overlaps with the UL transmission scheduled during the first time period may include a UL beam indication in the DCI message indicating a UL beam used for the UL transmission. The UL beam indication may be indicative of whether a default DL beam associated with the first node can be paired with the UL beam during the FD mode.

Clause 26. Another aspect of the subject matter described in this disclosure can be implemented in an apparatus of a first node. The apparatus of the first node may include one or more processors and one or more interfaces. The one or more processors may be configured to establish a first wireless connection with a second node of a WWAN. The one or more interfaces may be configured to receive, from the second node, a DCI message for the first wireless connection. The DCI message may include an indication that a first FD UL and DL traffic scheduling combination of a plurality of FD UL and DL traffic scheduling combinations is being scheduled by the second node. The one or more interfaces may be configured to transmit UL traffic to the second node in accordance with the first FD UL and DL traffic scheduling combination, and receive DL traffic from the second node in accordance with the first FD UL and DL traffic scheduling combination.

Clause 27. The method of clause 26, where the one or more processors configured to receive the DCI message includes the one or more processors configured to receive one or more bits indicating the first FD UL and DL traffic scheduling combination is being scheduled by the second node, or receive one or more fields indicating the first FD UL and DL traffic scheduling combination is being scheduled by the second node.

Clause 28. The method of any one or more of clauses 26-27, where the one or more processors configured to receive the DCI message includes the one or more processors configured to receive one or more dedicated bits indicating the first FD UL and DL traffic scheduling combination is being scheduled by the second node, the received DCI message having a DCI format with a larger payload than existing DCI formats, or receive one or more dedicated fields indicating the first FD UL and DL traffic scheduling combination is being scheduled by the second node, the received DCI message having a DCI format with a larger payload than existing DCI formats.

Clause 29. The method of any one or more of clauses 26-28, where the one or more processors configured to receive the DCI message includes the one or more processors configured to receive a first RNTI indicating a DL transmission of the first FD UL and DL traffic scheduling combination is being scheduled by the second node, and receive one or more bits indicating a UL transmission of the first FD UL and DL traffic scheduling combination is being scheduled by the second node.

Clause 30. The method of any one or more of clauses 26-29, where the one or more processors configured to receive the DCI message includes the one or more processors configured to receive an RNTI indicating which one of the plurality of FD UL and DL traffic scheduling combinations is being scheduled by the second node.

Another aspect of the subject matter described in this disclosure can be implemented as a non-transitory computer-readable medium having stored therein instructions which, when executed by one or more processors of a node, cause the node to perform any one of the above-mentioned methods or features described herein.

Another aspect of the subject matter described in this disclosure can be implemented as an apparatus having means for implementing any one of the above-mentioned methods or features described herein.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication performed by a first node, comprising:
   receiving, from a second node of a wireless wide area network (WWAN), a downlink control information (DCI) message that includes an indication that a first full duplex (FD) uplink (UL) and downlink (DL) traffic scheduling combination of a plurality of FD UL and DL traffic scheduling combinations is scheduled by the second node, the DCI message being scrambled by a radio network temporary identifier (RNTI) that indicates a selection of the first FD UL and DL traffic scheduling combination, and the first FD UL and DL traffic scheduling combination comprising both a FD UL scheduling and a FD DL scheduling signaled by one or more bits included in the DCI message;
   transmitting FD UL traffic to the second node in accordance with the first FD UL and DL traffic scheduling combination; and
   receiving FD DL traffic from the second node in accordance with the first FD UL and DL traffic scheduling combination.

2. The method of claim 1, wherein the plurality of FD UL and DL traffic scheduling combinations includes:
   Physical Downlink Shared Channel (PDSCH) DL traffic and Physical Uplink Shared Channel (PUSCH) UL traffic,
   semi-persistent scheduling (SPS) DL traffic and PUSCH UL traffic,
   PDSCH DL traffic and configured grant (CG) UL traffic, and
   SPS DL traffic and CG UL traffic.

3. The method of claim 1, wherein receiving the DCI message further comprises:
   receiving the one or more bits indicating the first FD UL and DL traffic scheduling combination is scheduled by the second node, or receiving one or more fields indicating the first FD UL and DL traffic scheduling combination is scheduled by the second node.

4. The method of claim 3, wherein:
   the one or more bits are one or more dedicated or reserved bits of the received DCI message, or the one or more fields are one or more dedicated or reserved fields of the received DCI message.

5. The method of claim 3, wherein:
the one or more bits are one or more reserved bits of the received DCI message having an existing DCI format, and
the one or more fields are one or more reused fields of the received DCI message having an existing DCI format, or the one or more fields are one or more additional fields of the received DCI message having an existing DCI format with one or more compressed fields.

6. The method of claim 1, wherein receiving the DCI message further comprises:
receiving one or more dedicated bits indicating the first FD UL and DL traffic scheduling combination is scheduled by the second node, the received DCI message having a DCI format with a larger payload than existing DCI formats, or receiving one or more dedicated fields indicating the first FD UL and DL traffic scheduling combination is scheduled by the second node, the received DCI message having a DCI format with a larger payload than existing DCI formats.

7. The method of claim 1, wherein receiving the DCI message further comprises:
receiving the RNTI indicating a DL transmission of the first FD UL and DL traffic scheduling combination is scheduled by the second node; and
receiving the one or more bits indicating a UL transmission of the first FD UL and DL traffic scheduling combination is scheduled by the second node.

8. The method of claim 1, wherein:
a first RNTI indicates the first FD UL and DL traffic scheduling combination of the plurality of FD UL and DL traffic scheduling combinations is scheduled by the first node,
a second RNTI indicates a second FD UL and DL traffic scheduling combination of the plurality of FD UL and DL traffic scheduling combinations is scheduled by the first node, and
a third RNTI indicates a third FD UL and DL traffic scheduling combination of the plurality of FD UL and DL traffic scheduling combinations is scheduled by the first node, and a fourth RNTI indicates a fourth FD UL and DL traffic scheduling combination of the plurality of FD UL and DL traffic scheduling combinations is scheduled by the first node.

9. A method for wireless communication performed by a first node, comprising:
scheduling a first full duplex (FD) uplink (UL) and downlink (DL) traffic scheduling combination of a plurality of FD UL and DL traffic scheduling combinations for a first wireless connection with a second node of a wireless wide area network (WWAN);
generating a downlink control information (DCI) message that includes an indication of the first FD UL and DL traffic scheduling combination scheduled for the first wireless connection, the DCI message being scrambled by a radio network temporary identifier (RNTI) that indicates a selection of the first FD UL and DL traffic scheduling combination, and the first FD UL and DL traffic scheduling combination comprising both a FD UL scheduling and a FD DL scheduling signaled by one or more bits included in the DCI message; and
transmitting the DCI message to the second node.

10. The method of claim 9, wherein the plurality of FD UL and DL traffic scheduling combinations includes:
Physical Downlink Shared Channel (PDSCH) DL traffic and Physical Uplink Shared Channel (PUSCH) UL traffic,
semi-persistent scheduling (SPS) DL traffic and PUSCH UL traffic,
PDSCH DL traffic and configured grant (CG) UL traffic, and
SPS DL traffic and CG UL traffic.

11. The method of claim 9, wherein generating the DCI message including the indication of the first FD UL and DL traffic scheduling combination further comprises generating the DCI message by at least one of:
compressing one or more fields of the DCI message for scheduling DL and UL traffic via the DCI message;
reusing one or more fields of the DCI message for scheduling FD DL traffic and FD UL traffic via the DCI message; and
using one or more reserved bits of the DCI message for scheduling the FD DL traffic and the FD UL traffic via the DCI message.

12. The method of claim 11, wherein generating the DCI message including the indication of the first FD UL and DL traffic scheduling combination further comprises generating the DCI message using an existing DCI format.

13. The method of claim 9, wherein generating the DCI message including the indication of the first FD UL and DL traffic scheduling combination further comprises generating the DCI message by at least one of:
using one or more dedicated bits of a DCI format having a larger payload than existing DCI formats for scheduling DL and UL traffic via the DCI message, and
using one or more dedicated fields of a DCI format having a larger payload than existing DCI formats for scheduling FD DL traffic and FD UL traffic via the DCI message.

14. The method of claim 9, wherein the indication of the first FD UL and DL traffic scheduling combination includes one of:
one or more dedicated fields or bits of the DCI message; and
one or more reserved fields or bits of the DCI message.

15. The method of claim 9, wherein generating the DCI message including the indication of the first FD UL and DL traffic scheduling combination further comprises generating the DCI message by:
using the RNTI to indicate a DL transmission of the first FD UL and DL traffic scheduling combination; and
using the one or more bits of the DCI message to indicate a UL transmission of the first FD UL and DL traffic scheduling combination.

16. The method of claim 9, wherein:
a first RNTI indicates the first FD UL and DL traffic scheduling combination of the plurality of FD UL and DL traffic scheduling combinations is scheduled by the first node,
a second RNTI indicates a second FD UL and DL traffic scheduling combination of the plurality of FD UL and DL traffic scheduling combinations is scheduled by the first node, and
a third RNTI indicates a third FD UL and DL traffic scheduling combination of the plurality of FD UL and DL traffic scheduling combinations is scheduled by the first node, and a fourth RNTI indicates a fourth FD UL and DL traffic scheduling combination of the plurality of FD UL and DL traffic scheduling combinations is scheduled by the first node.

17. An apparatus for wireless communication at a first node, comprising:

a processing system that includes one or more processors and one or more memories coupled with the one or more processors, the processing system configured to cause the apparatus to:
receive, from a second node of a wireless wide area network (WWAN), a downlink control information (DCI) message that includes an indication that a first full duplex (FD) uplink (UL) and downlink (DL) traffic scheduling combination of a plurality of FD UL and DL traffic scheduling combinations is scheduled by the second node, the DCI message being scrambled by a radio network temporary identifier (RNTI) that indicates a selection of the first FD UL and DL traffic scheduling combination, and the first FD UL and DL traffic scheduling combination comprising both a FD UL scheduling and a FD DL scheduling signaled by one or more bits included in the DCI message;
transmit FD UL traffic to the second node in accordance with the first FD UL and DL traffic scheduling combination; and
receive FD DL traffic from the second node in accordance with the first FD UL and DL traffic scheduling combination.

18. The apparatus of claim 17, wherein the processing system is further configured to cause the apparatus to:
receive the one or more bits indicating the first FD UL and DL traffic scheduling combination is scheduled by the second node, or receive one or more fields indicating the first FD UL and DL traffic scheduling combination is scheduled by the second node.

19. The apparatus of claim 17, wherein the processing system is further configured to cause the apparatus to:
receive one or more dedicated bits indicating the first FD UL and DL traffic scheduling combination is scheduled by the second node, the received DCI message having a DCI format with a larger payload than existing DCI formats, or
receive one or more dedicated fields indicating the first FD UL and DL traffic scheduling combination is scheduled by the second node, the received DCI message having a DCI format with a larger payload than existing DCI formats.

20. The apparatus of claim 17, wherein the processing system is further configured to cause the apparatus to:
receive the RNTI indicating a DL transmission of the first FD UL and DL traffic scheduling combination is scheduled by the second node; and
receive the one or more bits indicating a UL transmission of the first FD UL and DL traffic scheduling combination is scheduled by the second node.

21. An apparatus for wireless communications at a first node, comprising:
a processing system that includes one or more processors and one or more memories coupled with the one or more processors, the processing system configured to cause the apparatus to:
schedule a first full duplex (FD) uplink (UL) and downlink (DL) traffic scheduling combination of a plurality of FD UL and DL traffic scheduling combinations for a first wireless connection with a second node of a wireless wide area network (WWAN);
generate a downlink control information (DCI) message that includes an indication of the first FD UL and DL traffic scheduling combination scheduled for the first wireless connection, the DCI message being scrambled by a radio network temporary identifier (RNTI) that indicates a selection of the first FD UL and DL traffic scheduling combination, and the first FD UL and DL traffic scheduling combination comprising both a FD UL scheduling and a FD DL scheduling signaled by one or more bits included in the DCI message; and
transmit the DCI message to the second node.

22. The apparatus of claim 21, wherein the processing system is further configured to cause the apparatus to:
generate the DCI message by at least one of:
compressing one or more fields of the DCI message for scheduling DL and UL traffic via the DCI message;
reusing one or more fields of the DCI message for scheduling FD DL traffic and FD UL traffic via the DCI message; and
using one or more reserved bits of the DCI message for scheduling the FD DL traffic and the FD UL traffic via the DCI message.

23. The apparatus of claim 21, wherein the processing system is further configured to cause the apparatus to:
generate the DCI message by at least one of:
using one or more dedicated bits of a DCI format having a larger payload than existing DCI formats for scheduling DL and UL traffic via the DCI message, and using one or more dedicated fields of a DCI format having a larger payload than existing DCI formats for scheduling FD DL traffic and FD UL traffic via the DCI message.

24. The apparatus of claim 21, wherein the indication of the first FD UL and DL traffic scheduling combination includes one of:
one or more dedicated fields or bits of the DCI message; and
one or more reserved fields or bits of the DCI message.

25. The apparatus of claim 21, wherein the processing system is further configured to cause the apparatus to:
generate the DCI message by at least one of:
using the RNTI to indicate a DL transmission of the first FD UL and DL traffic scheduling combination, and
using the one or more bits of the DCI message to indicate a UL transmission of the first FD UL and DL traffic scheduling combination.

* * * * *